(12) United States Patent
Takenaka et al.

(10) Patent No.: US 11,049,215 B2
(45) Date of Patent: *Jun. 29, 2021

(54) IMAGE CAPTURING APPARATUS, IMAGE CAPTURE SYSTEM, IMAGE PROCESSING METHOD, INFORMATION PROCESSING APPARATUS, AND COMPUTER-READABLE STORAGE MEDIUM

(71) Applicant: RICOH COMPANY, LTD., Tokyo (JP)

(72) Inventors: Hirokazu Takenaka, Kanagawa (JP); Yoshiaki Irino, Kanagawa (JP); Tomonori Tanaka, Kanagawa (JP); Nozomi Imae, Kanagawa (JP); Hideaki Yamamoto, Kanagawa (JP); Kensuke Masuda, Kanagawa (JP); Yoichi Ito, Tokyo (JP); Satoshi Sawaguchi, Kanagawa (JP); Daisuke Bessho, Kanagawa (JP); Hiroyuki Satoh, Kanagawa (JP); Makoto Shohara, Tokyo (JP); Noriyuki Terao, Miyagi (JP); Toru Harada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 3 days.

This patent is subject to a terminal disclaimer.

(21) Appl. No.: 15/400,610

(22) Filed: Jan. 6, 2017

(65) Prior Publication Data
US 2017/0116704 A1 Apr. 27, 2017

Related U.S. Application Data

(63) Continuation of application No. 14/384,027, filed as application No. PCT/JP2013/057338 on Mar. 11, 2013, now Pat. No. 9,607,358.

(30) Foreign Application Priority Data

Mar. 9, 2012 (JP) .............................. JP2012-053190
Nov. 30, 2012 (JP) .............................. JP2012-263542

(51) Int. Cl.
*H04N 5/225* (2006.01)
*G06T 3/00* (2006.01)
*H04N 5/232* (2006.01)

(52) U.S. Cl.
CPC ........ *G06T 3/0062* (2013.01); *H04N 5/23238* (2013.01)

(58) Field of Classification Search
CPC ............. H04N 5/2254; H04N 5/23238; H04N 5/23212; G01J 9/00; G03B 2205/0069; G06T 1/0007; G06T 7/593; G06T 3/0062
See application file for complete search history.

(56) References Cited

U.S. PATENT DOCUMENTS

| | | | |
|---|---|---|---|
| 6,304,284 | B1 | 10/2001 | Dunton et al. |
| 2001/0015751 | A1 | 8/2001 | Geng |

(Continued)

FOREIGN PATENT DOCUMENTS

| | | |
|---|---|---|
| CN | 1725857 | 1/2006 |
| JP | 11-084482 | 3/1999 |

(Continued)

OTHER PUBLICATIONS

Extended European Search Report dated May 18, 2017 in European Patent Application No. 17155235.9.

(Continued)

*Primary Examiner* — Twyler L Haskins
*Assistant Examiner* — Dwight Alex C Tejano
(74) *Attorney, Agent, or Firm* — Xsensus LLP

(57) ABSTRACT

An image capturing apparatus includes a tilt detection unit that detects a tilt in the vertical direction, conversion data used for transforming plane coordinates into spherical coordinates, a correction unit that corrects the conversion data according to the tilt, a plurality of image capturing units, a coordinate transformation unit that transforms plane coor- (Continued)

dinates of a plurality of pixels included in images captured by the image capturing units into spherical coordinates according to the conversion data corrected by the correction unit, and a combining unit that combines the images including the pixels transformed into spherical coordinates by the coordinate transformation unit.

17 Claims, 18 Drawing Sheets

(56) References Cited

U.S. PATENT DOCUMENTS

| | | | |
|---|---|---|---|
| 2003/0142203 A1 | 7/2003 | Kawakami et al. | |
| 2004/0104996 A1 | 6/2004 | Hayashi et al. | |
| 2005/0062869 A1* | 3/2005 | Zimmermann | G02B 13/06 348/335 |
| 2005/0195295 A1* | 9/2005 | Kawai | H04N 5/2254 348/239 |
| 2006/0018509 A1 | 1/2006 | Miyoshi et al. | |
| 2006/0029256 A1 | 2/2006 | Miyoshi | |
| 2007/0269188 A1 | 11/2007 | Shiga | |
| 2009/0040291 A1* | 2/2009 | McCall | H04N 5/2254 348/36 |
| 2009/0167886 A1 | 7/2009 | Tonomura | |
| 2010/0097444 A1 | 4/2010 | Lablans | |
| 2010/0208032 A1 | 8/2010 | Kweon | |
| 2011/0115879 A1* | 5/2011 | Homma | G03B 17/02 348/36 |
| 2011/0181689 A1 | 7/2011 | Kweon | |
| 2011/0242394 A1 | 10/2011 | Ohdate | |
| 2012/0033100 A1* | 2/2012 | Harikae | H04N 1/00307 348/223.1 |
| 2012/0105578 A1* | 5/2012 | Ohmiya | G06T 7/73 348/36 |
| 2013/0235149 A1* | 9/2013 | Tanaka | H04N 5/23238 348/36 |
| 2013/0242040 A1* | 9/2013 | Masuda | H04N 5/2251 348/36 |
| 2014/0071227 A1* | 3/2014 | Takenaka | H04N 5/23238 348/36 |
| 2014/0176542 A1 | 6/2014 | Shohara | |
| 2015/0062363 A1 | 3/2015 | Takenaka et al. | |
| 2015/0103197 A1 | 4/2015 | Djordjevic | |
| 2015/0220781 A1* | 8/2015 | Ozaki | G06T 3/0062 382/103 |
| 2015/0254871 A1* | 9/2015 | MacMillan | G03B 37/04 382/180 |
| 2016/0073024 A1 | 3/2016 | Yamamoto | |
| 2017/0116704 A1 | 4/2017 | Takenaka et al. | |

FOREIGN PATENT DOCUMENTS

| | | |
|---|---|---|
| JP | 11-309137 | 11/1999 |
| JP | 2003-8968 A | 1/2003 |
| JP | 2003-223633 | 8/2003 |
| JP | 2003-524306 | 8/2003 |
| JP | 2005-056295 | 3/2005 |
| JP | 2005-063141 | 3/2005 |
| JP | 2005-175952 | 6/2005 |
| JP | 2005-210651 A | 8/2005 |
| JP | 2005-244861 A | 9/2005 |
| JP | 2005-275789 A | 10/2005 |
| JP | 2006-033570 | 2/2006 |
| JP | 2006-059202 | 3/2006 |
| JP | 2006-222920 A | 8/2006 |
| JP | 2007-311904 | 11/2007 |
| JP | 2008-141649 A | 6/2008 |
| JP | 4175832 | 8/2008 |
| JP | 2008-205811 | 9/2008 |
| JP | 2009-064225 | 3/2009 |
| JP | 2009-176273 | 8/2009 |
| JP | 2009-267792 | 11/2009 |
| JP | 2010-239221 | 10/2010 |
| JP | 2011-040898 | 2/2011 |
| JP | 2011-061511 | 3/2011 |
| JP | 2011-114496 | 6/2011 |
| JP | 2011211541 A | 10/2011 |
| KR | 10-1961364 B1 | 3/2019 |
| WO | WO 99/51027 | 10/1999 |
| WO | WO 2005/015494 | 2/2005 |

OTHER PUBLICATIONS

Shigang Li, et al. "Full-View Car Navigator", 4th IEEE Conference on Automation Science and Engineering, XP031321718, Aug. 23, 2008, pp. 744-749.

Yutaka Satoh, et al. "Development of Intelligent Wheelchair System based on Stereo Omni-directional System (SOS)", TENCON 2005: IEEE Region 10 Conference, XP031015682, Nov. 21-24, 2005, pp. 1-6.

International Search Report dated May 21, 2013 in PCT/JP2013/057338 filed on Mar. 11, 2013.

Extended European Search Report dated Jun. 26, 2015 in Patent Application No. 13757254.1.

Shigang Li, "Sky-ground Representation for Local Scene Description" Proceedings of the 17th International Conference on Pattern Recognition, vol. 3, XP010724647, Aug. 23, 2004, pp. 1-4.

Mauro Turturici, et al., "Low-power Embedded System for Real-Time Correction of Fish-Eye Automotive Cameras" Design, automation and test in Europe, EDA Consortium, XP058021618A, Mar. 12, 2012, pp. 1-2.

Office Action dated Jul. 1, 2016 in Korean Patent Application No. 10-2016-7008975 (with English language translation).

Office Action dated Nov. 4, 2016 in Chinese Patent Application No. 201380012472.2 (with English language translation).

Japanese Office Action dated Sep. 26, 2017 in Patent Application No. 2012-263542.

Notice of Allowance dated Aug. 14, 2019, issued in corresponding Korean Patent Application No. 2019-7007730, 5 pages with English Translation.

Japanese Office Action dated Jun. 25, 2019, issued in corresponding Japanese Application No. 2017-226953, 9 pages (with machine generated English Translation).

Korean Office Action dated Jun. 10, 2019, in corresponding Korean Patent Application No. 10-2019-7007730, 7 pages (with English Translation).

* cited by examiner

FIG.4
(a) LENS
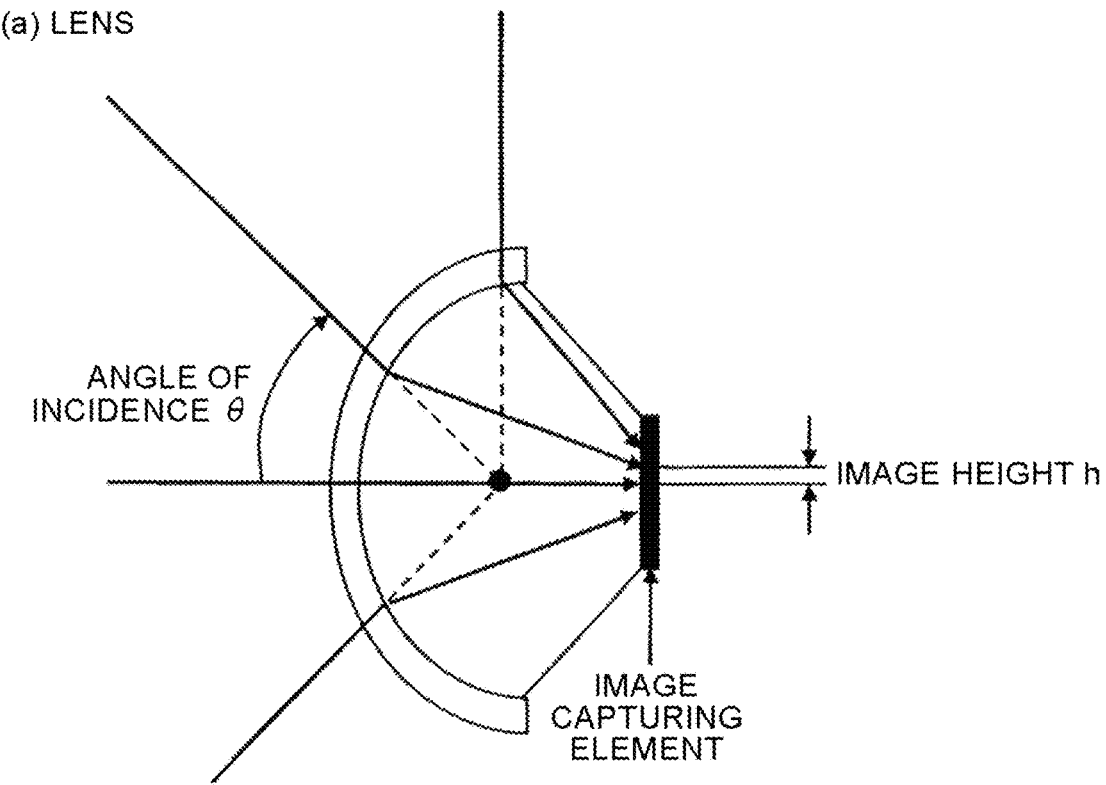
(b) CAPTURED IMAGE
IMAGE HEIGHT h = f(θ)
f: PROJECTION FUNCTION
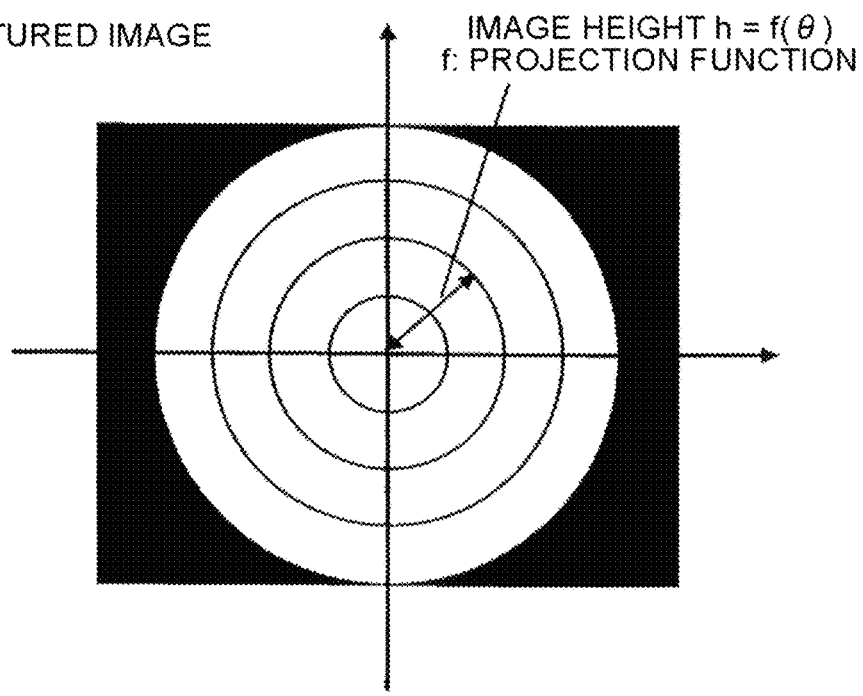

FIG.5
(a)
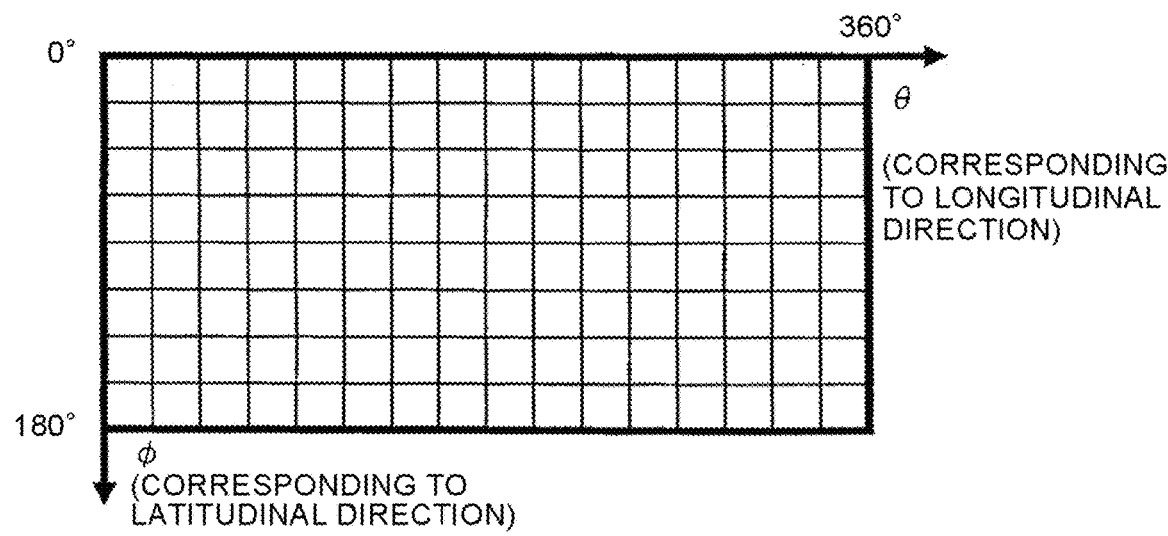
(b)
CORRESPONDS TO COORDINATES ON SPHERE AS BELOW
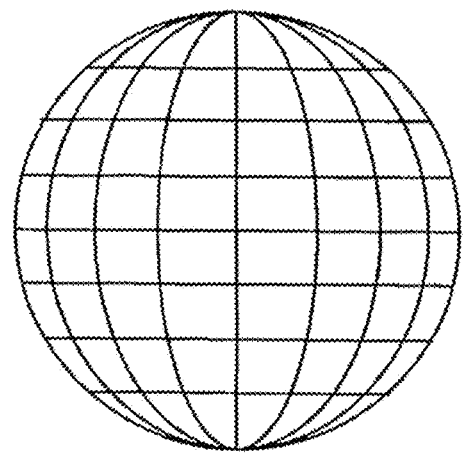

FIG.7
(a)
| COORDINATES OF POST-CONVERSION IMAGE | | COORDINATES OF PRE-CONVERSION IMAGE | |
|---|---|---|---|
| θ (pix) | φ (pix) | x(pix) | y(pix) |
| 0 | 0 | | |
| 1 | 0 | | |
| 2 | 0 | | |
| ～ | ～ | ～ | ～ |
| 3597 | 1799 | | |
| 3598 | 1799 | | |
| 3599 | 1799 | | |
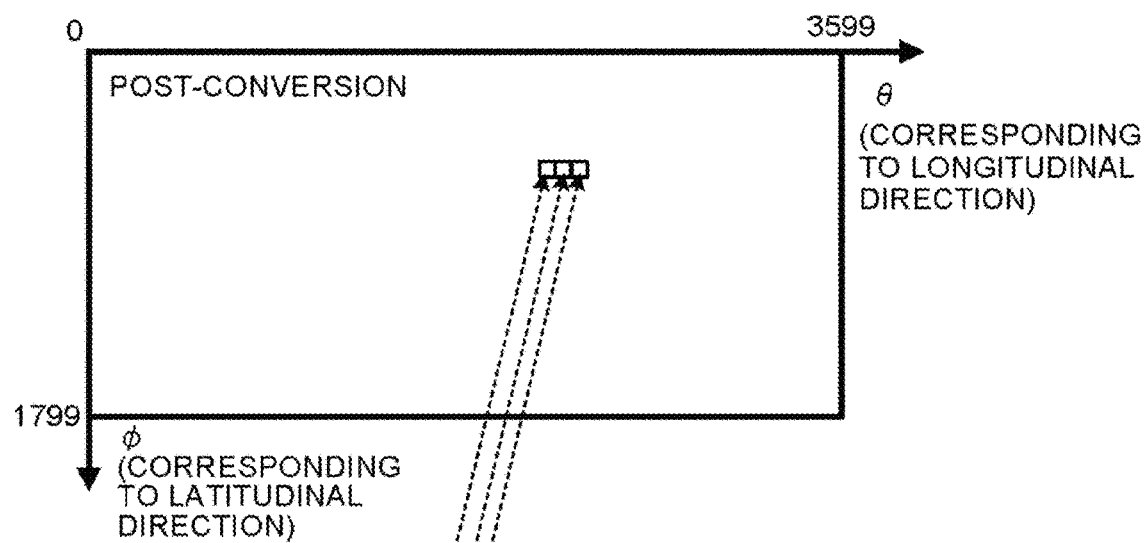
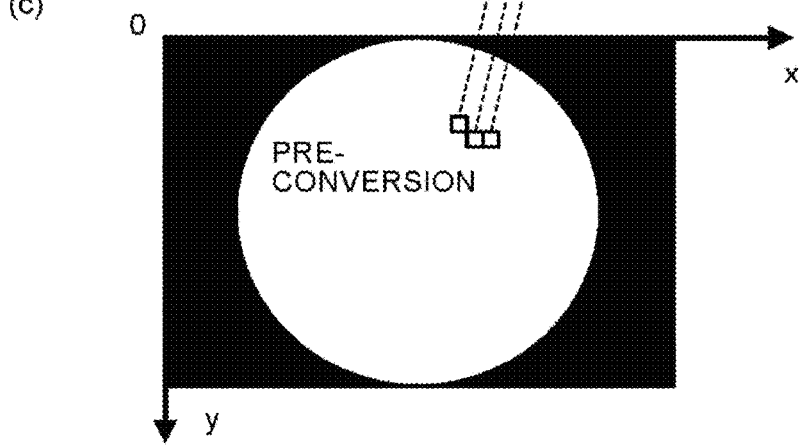

FIG.9

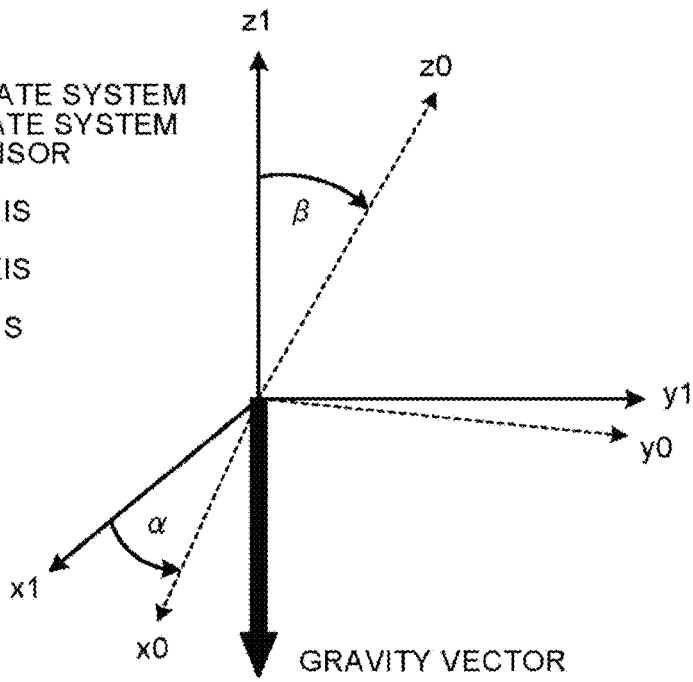

(x0, y0, z0) IN CAMERA COORDINATE SYSTEM
(x1, y1, z1) IN GLOBAL COORDINATE SYSTEM
OUTPUT OF ACCELERATION SENSOR
(Ax, Ay, Az)
Ax: COMPONENT VALUE IN x0-AXIS DIRECTION OF ACCELERATION
Ay: COMPONENT VALUE IN y0-AXIS DIRECTION OF ACCELERATION
Az COMPONENT VALUE IN z0-AXIS DIRECTION OF ACCELERATION $$\alpha = \text{Arctan}(Ax/Ay)$$
$$\beta = \text{Arccos}(Az/\sqrt{Ax^2 + Ay^2 + Az^2})$$

TILT ANGLE $\alpha$ IN GRAVITY VECTOR AND GRADIENT ANGLE $\beta$ IN XY PLANE ARE OBTAINED FROM EXPRESSION BELOW USING OUTPUT OF ACCELERATION SENSOR

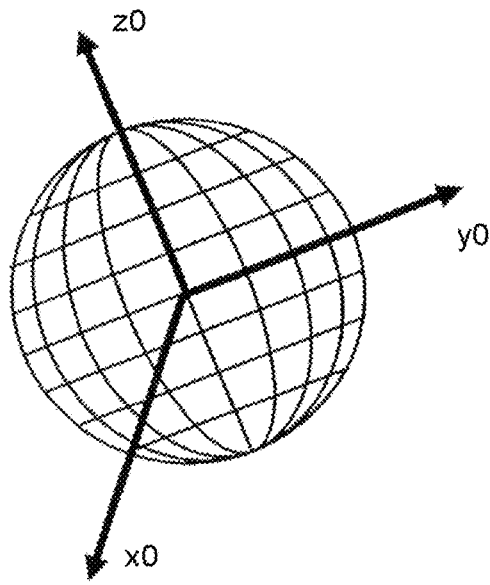

(b)

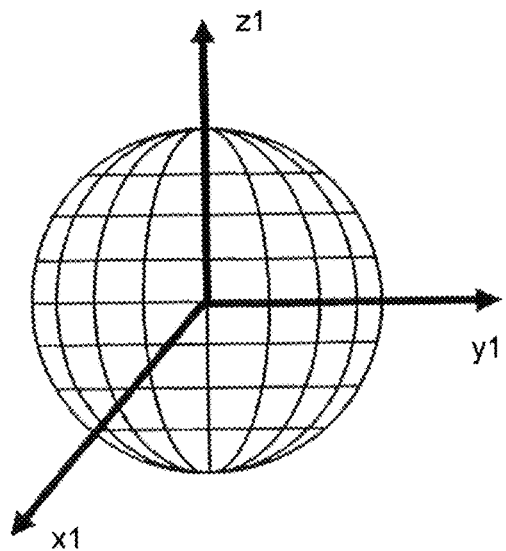

GLOBAL COORDINATE SYSTEM: THREE-DIMENSIONAL CARTESIAN COORDINATES (x1, y1, z1), SPHERICAL COORDINATES ($\theta 1, \phi 1$)
CAMERA COORDINATE SYSTEM: THREE-DIMENSIONAL CARTESIAN COORDINATES (x0, y0, z0), SPHERICAL COORDINATES ($\theta 0, \phi 0$)
WHERE RADIUS OF SPHERICAL COORDINATES IS 1

$x1 = \sin(\phi 1)\cos(\theta 1)$ ···(1)

$y1 = \sin(\phi 1)\sin(\theta 1)$ ···(2)

$z1 = \cos(\phi 1)$ ···(3)

$$\begin{pmatrix} x0 \\ y0 \\ z0 \end{pmatrix} = \begin{pmatrix} \cos\alpha & \sin\alpha & 0 \\ -\sin\alpha & \cos\alpha & 0 \\ 0 & 0 & 1 \end{pmatrix} \begin{pmatrix} 1 & 0 & 0 \\ 0 & \cos\beta & \sin\beta \\ 0 & -\sin\beta & \cos\beta \end{pmatrix} \begin{pmatrix} x1 \\ y1 \\ z1 \end{pmatrix} \quad \cdots(4)$$

$\phi 0 = \mathrm{Arc}\cos(z0)$ ···(5)

$\theta 0 = \mathrm{Arc}\tan(y0/x0)$ ···(6)

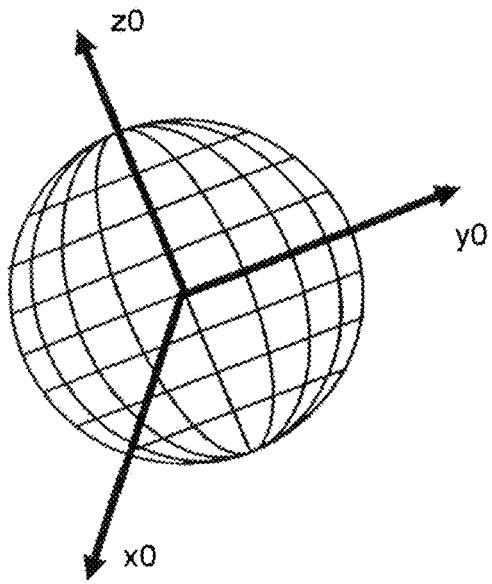

(b)

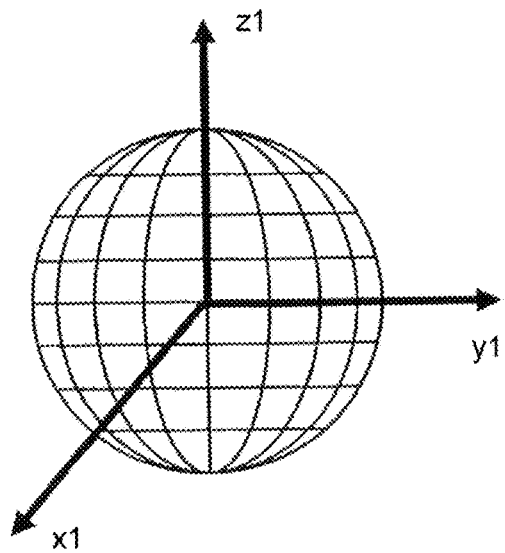

GLOBAL COORDINATE SYSTEM: THREE-DIMENSIONAL CARTESIAN COORDINATES (x1, y1 ,z1), SPHERICAL COORDINATES ($\theta 1$, $\phi 1$)
CAMERA COORDINATE SYSTEM: THREE-DIMENSIONAL CARTESIAN COORDINATES (x0, y0 ,z0), SPHERICAL COORDINATES ($\theta 0$, $\phi 0$)
WHERE RADIUS OF SPHERICAL COORDINATES IS 1

$$x1' = \sin(\phi 1)\cos(\theta 1) \quad \cdots (7)$$
$$y1' = \sin(\phi 1)\sin(\theta 1) \quad \cdots (8)$$
$$z1' = \cos(\phi 1) \quad \cdots (9)$$

$$\begin{pmatrix} x0' \\ y0' \\ z0' \end{pmatrix} = \begin{pmatrix} 1 & 0 & 0 \\ 0 & \cos\beta & \sin\beta \\ 0 & -\sin\beta & \cos\beta \end{pmatrix} \begin{pmatrix} x1' \\ y1' \\ z1' \end{pmatrix} \quad \cdots (10)$$

$$\theta 0' = \text{Arctan}(y0'/x0') \quad \cdots (11)$$
$$\phi 0' = \text{Arccos}(z0') \quad \cdots (12)$$

$$\theta 0 = \theta 0' - \alpha \quad \cdots (13)$$
$$\phi 0 = \phi 0' \quad \cdots (14)$$

FIG.13
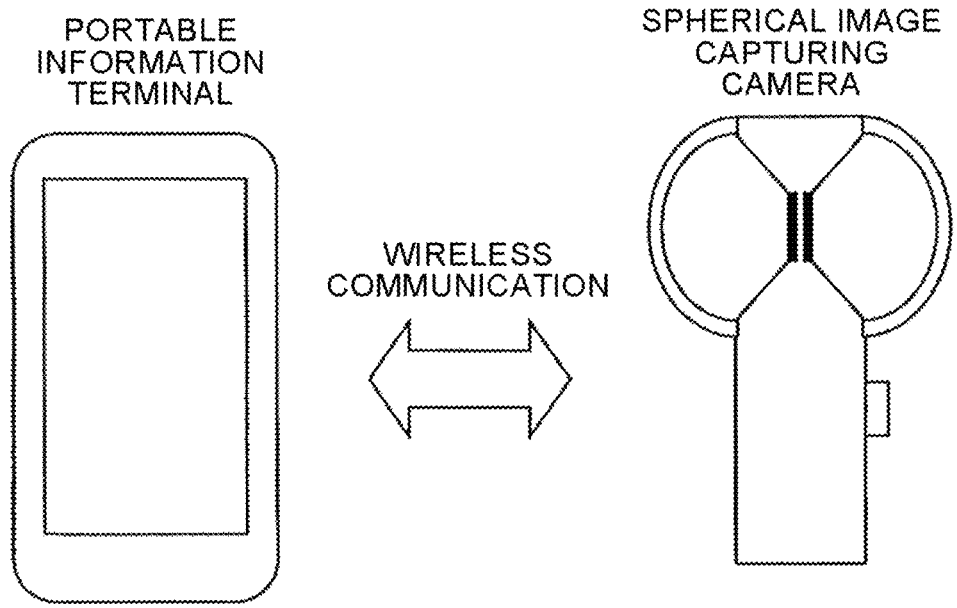
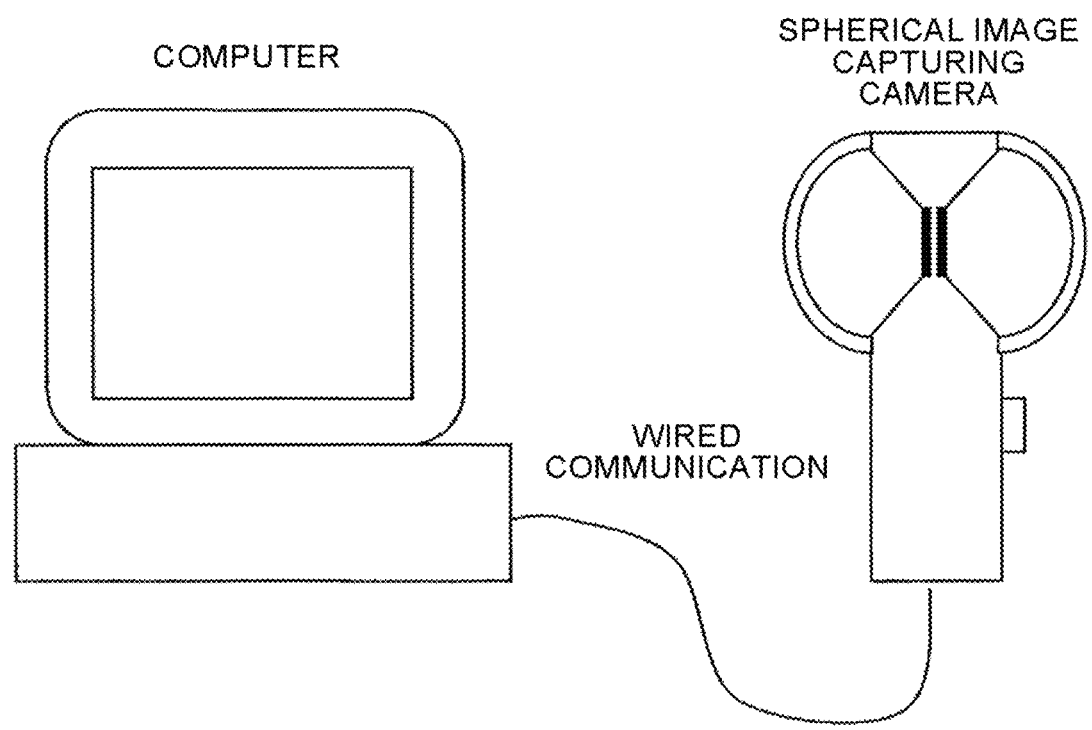

IMAGE CAPTURING APPARATUS, IMAGE CAPTURE SYSTEM, IMAGE PROCESSING METHOD, INFORMATION PROCESSING APPARATUS, AND COMPUTER-READABLE STORAGE MEDIUM

CROSS REFERENCE TO RELATED APPLICATIONS

This patent application is a Continuation Application of U.S. application Ser. No. 14/384,027, filed Sep. 9, 2014, which is a National Stage Application of International Application No. PCT/JP13/057338, filed Mar. 11, 2013, which is based on and claims priority to Japanese Patent Application Nos. 2012-263542, filed Nov. 30, 2012, and 2012-053190, filed Mar. 9, 2012, the entire contents of each of the above are hereby incorporated by reference herein.

TECHNICAL FIELD

The present invention relates to an image capturing apparatus, an image capture system, an information processing apparatus, and a computer-readable storage medium.

BACKGROUND ART

Conventional image capturing apparatuses that capture images in all directions or spherically employ a hyperboloidal mirror or a fisheye lens, for example. These image capturing apparatuses are specific optical systems that need a non-linear image processing such as distortion correction or projective transformation so that the captured image with the apparatus can be visualized to a user.

One of known technologies is that a semispherical image is obtained with a wide-angle capture employing a fisheye lens and recorded as a distorted circular image. A part of the distorted circular image is cut out and image processing is performed on the image with a computer, whereby the distorted image is transformed into a plane regular image.

Another known technology is that while performing the image processing above, when the center position of the distorted circular image does not correctly correspond to the vertical point direction, a user specifies a parameter of a tilt angle. The load while performing distortion correction on the image is therefore reduced.

As described above, when images are captured in a state of the image capturing apparatus being tilted, an omni-directional spherical image in the wrong vertical direction may be generated. Some inventions to solve this problem have been already known.

Japanese Patent Application Laid-open No. 2003-223633 and Japanese Patent Application Laid-open No. 2006-059202 disclose a technology of generating an omni-directional spherical image having the correct vertical direction. This is achieved by adding rotational transformation according to the tilt of a camera to the process of non-linear image processing.

Japanese Patent Application Laid-open No. H11-309137 and Japanese Patent No. 4175832 disclose a technology of generating an omni-directional spherical image having the correct vertical direction at high speed, for the purpose of reducing the time required for generating the omni-directional spherical image having the correct vertical direction or reducing the cost on arithmetic operations. This technology is achieved by adding rotational transformation according to the tilt of the camera, in addition to distortion correction or projective transformation, preparing a conversion table used for non-linear transformation in advance, and performing batch transformation through the conversion table when capturing images.

With the structure of previous spherical image capturing apparatuses, however, users are required to specify a tilt angle of the apparatus during capture when combining a plurality of images captured at once from a plurality of image capturing directions, when transforming the combined image into a plane regular image, and when displaying the resulting image. That is to say, there was a problem in that a necessary parameter for correction could not be obtained during capture for automatically correcting the image.

Additionally, with the previously performed method for capturing images in all directions or spherically through a conversion table according to the tilt, if the amount or orientation of the tilt changes, the conversion table needs to be re-made from the beginning. In this case, processing requires a relatively long time to generate an omni-directional spherical image having the correct vertical direction according to any tilt of the image capturing apparatus.

Japanese Patent Application Laid-open No. H11-309137 and Japanese Patent No. 4175832 disclose in particular a technology generating images using a conversion table that includes rotational transformation according to the tilt of the camera. The conversion table is made so as to correspond to the amount of tilt determined in advance. Accordingly, if the amount or orientation of the tilt changes so as to differ from the predetermined amount or orientation, the conversion table needs to be re-made from the beginning. Also in this case, the processing still requires a relatively long time to generate an omni-directional spherical image having the correct vertical direction according to any tilt of the image capturing apparatus, therefore the problem is not yet solved.

Therefore, there is a need to provide an image capturing apparatus capable of generating an omni-directional spherical image having the correct vertical direction, according to any tilt of the image capturing apparatus.

DISCLOSURE OF INVENTION

It is an object of the present invention to at least partially solve the problems in the conventional technology.

According to an embodiment, there is provided an image capturing apparatus that includes a tilt detection unit configured to detect a tilt in a vertical direction; conversion data used for transforming plane coordinates into spherical coordinates; a correction unit configured to correct the conversion data according to the tilt; a plurality of image capturing units; a coordinate transformation unit configured to transform plane coordinates of a plurality of pixels included in images captured by the image capturing units into spherical coordinates according to the conversion data corrected by the correction unit; and a combining unit configured to combine the images including the pixels transformed into spherical coordinates by the coordinate transformation unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 4 illustrates a projection relation of a fisheye lens employed in the image capturing apparatus according to the embodiment.

FIG. 5 illustrates a format for the omni-directional spherical image captured by the image capturing apparatus according to the embodiment.

FIG. 7 illustrates the conversion table for the omni-directional spherical image captured by the image capturing apparatus according to the embodiment.

FIG. 9 is a schematic diagram for explaining a tilt of the image capturing apparatus according to the embodiment.

FIG. 10 illustrates an example of calculation of vertical correction on the omni-directional spherical image captured by the image capturing apparatus according to the embodiment.

FIG. 11 illustrates another example of calculation of vertical correction on the omni-directional spherical image captured by the image capturing apparatus according to the embodiment.

FIG. 13 is a schematic diagram for explaining the overall structure of an image capture system according to another embodiment of the present invention.

BEST MODE(S) FOR CARRYING OUT THE INVENTION

Figure 1:
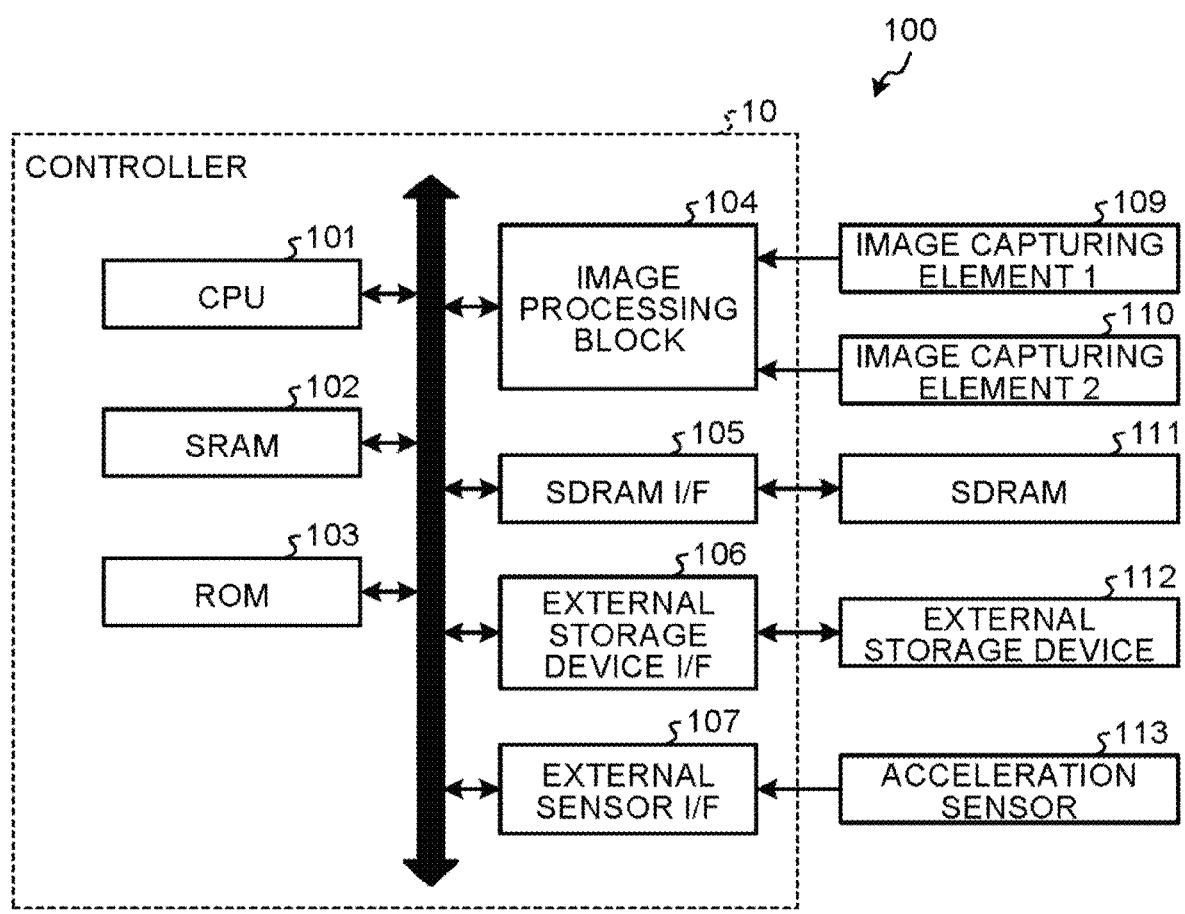
FIG. 1 is a schematic block diagram for explaining the overall structure of an image capturing apparatus according to an embodiment of the present invention.

Exemplary embodiments according to the present invention are described below with reference to the accompanying drawings. In the drawings and descriptions below, the same or equivalent components are designated by the same reference numerals, and overlapped explanation thereof will be simplified or omitted as appropriate. In the embodiments, when generating an omni-directional spherical image, the omni-directional spherical image capturing apparatus detects the vertical direction and corrects a conversion table used for image processing according to the vertical direction. In the embodiments, the omni-directional spherical image is generated through the corrected conversion table. Accordingly, the conversion table does not need to be re-made from the beginning, thereby reducing the processing time. The image capturing apparatus refers to a stand-alone apparatus, such as a digital camera; an image capture system refers to a system in which a plurality of apparatuses such as a digital camera and an information processing apparatus are utilized separately. In the embodiments, unless otherwise specified, the image capturing apparatus conceptually includes an image capture system.

Figure 16:
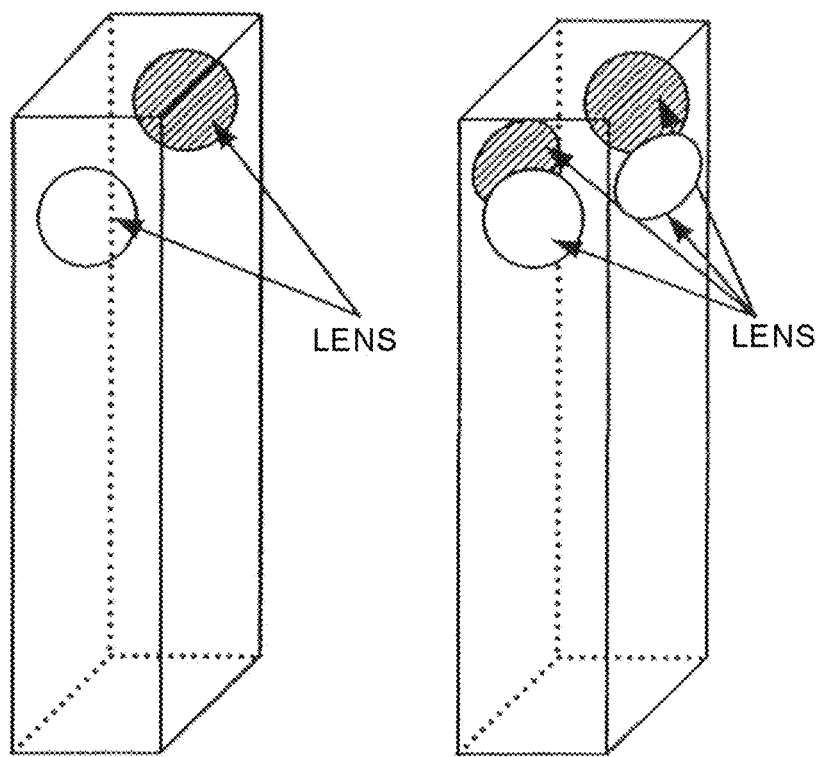
FIG. 16 is a diagram for explaining the structure of a multi-eye image capturing apparatus that captures images in all directions spherically at once.

A multi-eye image capturing apparatus will now be described that captures images in all directions spherically at once. FIG. 16 is a diagram for explaining the structure of a multi-eye image capturing apparatus that captures images in all directions spherically at once. An image capture system is prepared that employs a plurality of wide-angle lenses as illustrated in FIG. 16 so as to capture images in all directions spherically at once.

For example, the multi-eye image capturing apparatus illustrated on the left in FIG. 16 employs a fisheye lens (ultra wide-angle lens) with an angle of view equal to or larger than 180 degrees. The multi-eye image capturing apparatus requires at least the two-eye structure (image capture lenses with two different image capturing directions) to capture images in all directions spherically at once. If image distortion needs to be reduced as much as possible, the number of image capture lenses may be increased by employing, for example, the four-eye structure for the multi-eye image capturing apparatus as illustrated on the right in FIG. 16. With this structure, only center parts with high image quality are selectively used to reduce the image distortion. In this image capturing apparatus with the four-eye structure, it is recommended that respective lenses have an angle of view equal to or larger than 90 degrees, and preferably about 100 degrees.

The image capturing apparatus with two-eye structure will be described hereafter, for convenience of description. The basic idea of the present invention may be applied to the image capturing apparatus with the four-eye structure illustrated on the right in FIG. 16, however.

Figure 17:
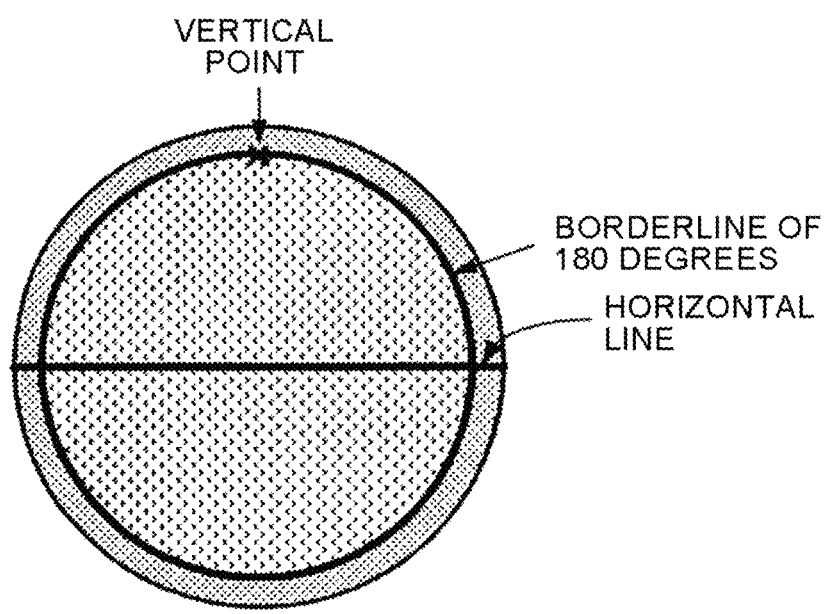
FIG. 17 is a diagram for explaining an image obtained through a lens in the multi-eye image capturing apparatus illustrated in FIG. 16.

In the image capturing apparatus, it is assumed that the central axis of the image capturing apparatus in the vertical direction corresponds to the vertical axis of the sphere. Specifically, an image obtained through each of two fisheye lenses is presented as illustrated in FIG. 17. FIG. 17 is a diagram for explaining an image obtained through a lens in a two-eye image capturing apparatus illustrated on the left in FIG. 16. As described above, it is preferred that images are captured so that the vertical point and the horizontal line recognized by a user of the image capturing apparatus correspond to the vertical point and the horizontal line of the image capturing apparatus.

The borderline of 180 degrees illustrated in FIG. 17 will be described. In an image capture system including two lenses (two image capturing directions), two images are captured so that the images have a superimposed field with each other. The images are combined utilizing the superimposed field. The outside part of the borderline of 180 degrees is the superimposed field. When two lenses are employed for the image capturing apparatus, accordingly, a lens has an angle of view equal to or larger than 180 degrees, and preferably about 190 degrees so as to provide the superimposed field. When four lenses are employed for the image capturing apparatus, a lens has an angle of view of about 100 degrees so as to provide an appropriate superimposed field.

With the structure employing four lenses illustrated on the right in FIG. 16 and when images are captured with the image capturing apparatus correctly being upright, the horizontal line is captured just horizontally in the same manner described above. The position of the vertical point recognized by the image capturing person using the apparatus corresponds to the position of the vertical point of the image capturing apparatus. The above-described technique is widely known for combining captured images to perform distortion correction on the combined image.

Figure 18:
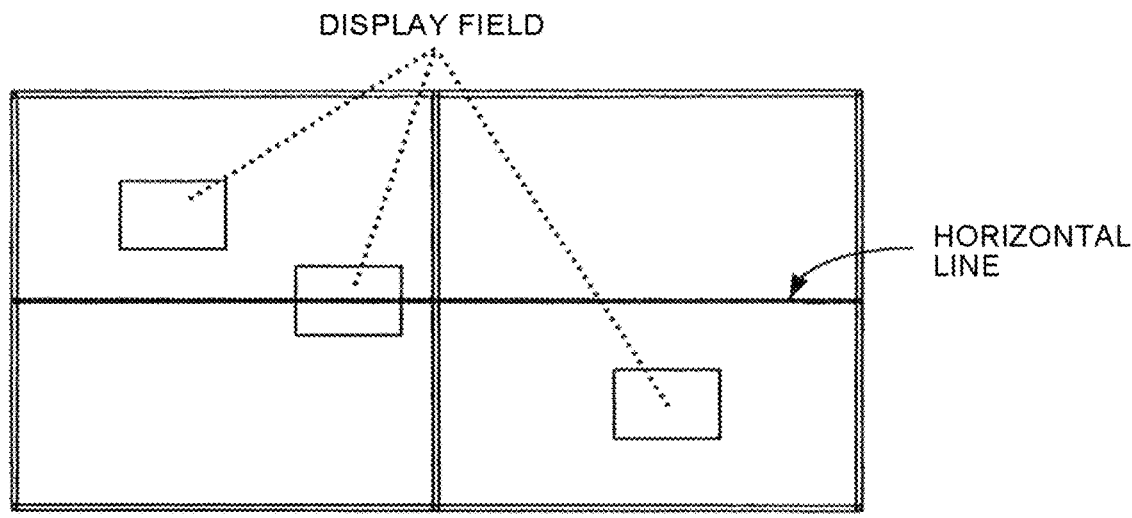
FIG. 18 is a diagram for explaining an image obtained by performing distortion correction on images illustrated in FIG. 17 and then combining the images with each other.

For example, when distortion correction is performed on a plurality of images and the images are combined with each other in the same manner as in Mercator projection, an image illustrated in FIG. 18 is obtained. FIG. 18 is a diagram for explaining an image obtained by performing distortion correction on images illustrated in FIG. 17 and then combining the images with each other.

When the image capturing apparatus is placed so as to be correctly upright and images are captured without the apparatus being tilted, a correct image can be obtained having the straight horizontal line as illustrated in FIG. 18 after distortion correction and combination are simply performed on the captured images. Specifically, images can be captured in the correct vertical direction when securing the image capturing apparatus to a certain retainer, and adjusting the horizontal and vertical lines of the apparatus using a level, for example.

Figure 19:
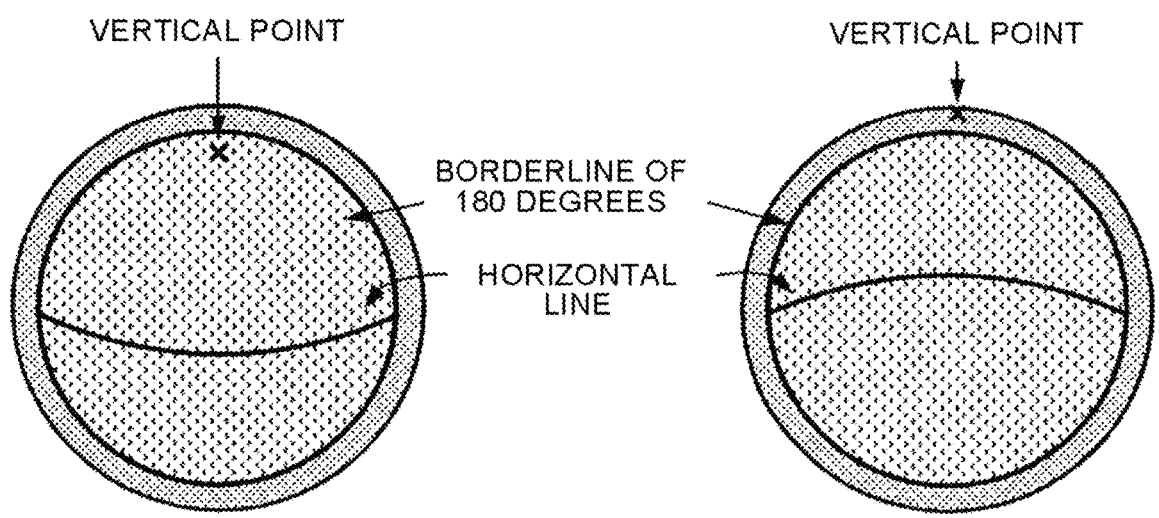
FIG. 19 is a diagram for explaining an image captured by the multi-eye image capturing apparatus illustrated in FIG. 16, with the image capturing apparatus in a state of being tilted.

FIG. 19 is a diagram for explaining an image captured by the multi-eye (two-eye) image capturing apparatus illustrated on the right in FIG. 16, with the image capturing apparatus in a state of being tilted. When a person holds the image capturing apparatus in its hand(s), it is generally difficult to capture images horizontally and vertically. FIG. 19 exemplifies images captured in such a state. As illustrated in FIG. 19 the vertical points of the images do not correspond to each other and the horizontal lines of the images are distorted. As described above, if distortion correction and combination are performed on images captured with the image capturing apparatus in a state of being tilted without consideration of the tilt, an image is obtained in which the distortion exemplified in FIG. 19 is directly reflected, as illustrated in FIG. 20.

Figure 20:
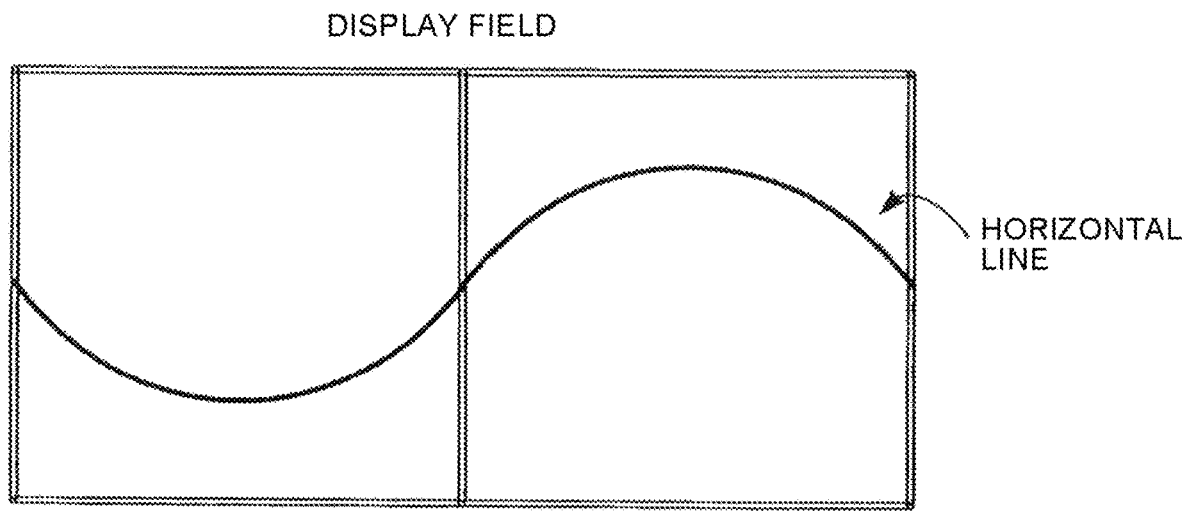
FIG. 20 is a diagram for explaining an image obtained by performing distortion correction and image combination on the image illustrated in FIG. 19 without consideration of the tilt.

If distortion correction and combination are performed on images captured with the image capturing apparatus in a state of being tilted without consideration of the tilt, the horizontal line is curved like a graph of a trigonometric function as illustrated in FIG. 20. In addition, the orthogonality of the image is broken. To avoid these problems, correction should be performed in consideration of a tilt angle in the vertical direction.

Figure 21:
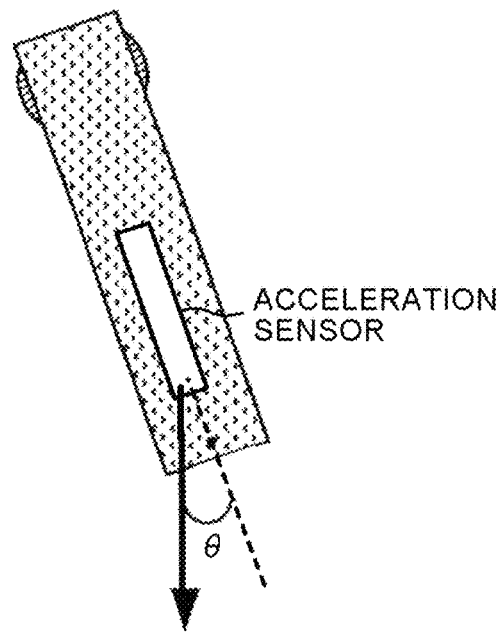
FIG. 21 is a schematic diagram for explaining an acceleration sensor that measures a tilt angle.

The principles of measurement of a tilt angle will now be described with reference to FIG. 21. FIG. 21 is a schematic diagram for explaining an acceleration sensor that measures a tilt angle.

An acceleration sensor as illustrated in FIG. 21 is embedded in the image capturing apparatus so as to measure how the image capturing apparatus tilts in the vertical direction using a gravity acceleration sensor.

FIG. 21 illustrates the outline of obtaining an angle using a single-axis acceleration sensor. This is employed to simplify the description. In FIG. 21, the sensor obtains only the tilt of the image capturing apparatus within the plane including the central axis of the lens surface in the two-eye structure. When a user actually captures images, however, it is assumed that images may be captured from the deviated angle from the plane as described above. To solve this problem a three-axis acceleration sensor is employed so as to measure the deviated angle from the plane including the central plane of the lens surface.

The image capturing apparatus according to the embodiment will now be described in detail. FIG. 1 is a schematic block diagram for explaining the overall structure of an electrical circuit of the image capturing apparatus according to the embodiment of the present invention. As illustrated in FIG. 1, in this image capturing apparatus (hereinafter, also referred to as a digital camera) 100, an image capturing element 1 (reference numeral: 109), an image capturing element 2 (reference numeral: 110), a synchronous dynamic random access memory (SDRAM) 111, an external storage device 112, and the acceleration sensor 113 are coupled to a controller 10.

In the embodiment, two capturing elements (i.e., the two-eye structure) are employed so as to obtain omni-directional images, however, three or more capturing elements may be employed. When three capturing elements are employed, a lens corresponding to the image capturing element, which will be described with reference to FIG. 2, does not require an angle of view equal to or larger than 180 degrees. Another angle of view of the lens may be employed as appropriate. Wide-angle lenses including a fisheye lens are typically employed for the lens. The image capturing apparatus is not limited to the omni-directional image capturing apparatus. Another image capturing apparatus capable of capturing images covering 360 degrees in the horizontal direction may be used.

The controller 10 includes a central processing unit (CPU) 101, a static RANI (SRAM) 102, a read-only memory (ROM) 103, an image processing block 104, an SDRAM interface (I/F) 105, an external storage device I/F 106, and an external sensor I/F 107.

In the description of the embodiment, the image processing block 104 performs typical image processing such as distortion correction and pixel defect correction, and the CPU reads a predetermined table or a computer program, thereby performing correction processing in the vertical direction according to the tilt of the digital camera 100. It is to be understood, however, that the image processing block 104 may perform correction processing in the vertical direction.

During capture, pieces of digitized image data are input to the image processing block 104 of the controller 10 through the image capturing element 1 (reference numeral: 109) and the image capturing element 2 (reference numeral: 110). The pieces of image data input are image-processed using the image processing block 104, the CPU 101, the SRAM 102, and the SDRAM 111, for example, and finally stored in the external storage device 112. Examples of an external storage device include CompactFlash (registered trademark) or a Secure Digital (SD) memory.

In the controller 10, a universal serial bus (USB) connection interface for connecting to an external device or a wired or wireless network I/F for connecting to a network may be provided. A conversion table, which will be described later, a correction processing program for the conversion table, and a processing program for calculation of vertical correction are stored in the SRAM 102 or the SDRAM 111.

The acceleration sensor 113 is used for detecting a tilt of the digital camera 100 during capture. This enables detection in the tilting direction of the digital camera instantly and readily.

The acceleration sensor 113 is a three-axis acceleration sensor that detects acceleration of the digital camera 100 in the three directions perpendicular to each other, i.e., the up and down direction, the right and left direction, and the back and front direction. When a user holds the digital camera 100 in its hand(s) so that the digital camera 100 remains still, the acceleration sensor 113 detects the gravity acceleration only.

When acceleration is detected only in the down direction in the up and down direction, it is found that the up and down direction of the digital camera 100 corresponds to the top and bottom direction with respect to the ground. In other words, it is known that the digital camera is held horizontally in the same manner usually operating a digital camera.

When the image capturing apparatus tilts in the top and bottom direction, the acceleration sensor 113 detects acceleration in the right and left direction and the back and front direction according to the actual tilting direction. A tilt angle of the digital camera 100 can be obtained according to the magnitude of acceleration in the up and down direction, the right and left direction, and the back and front direction.

Figure 2:
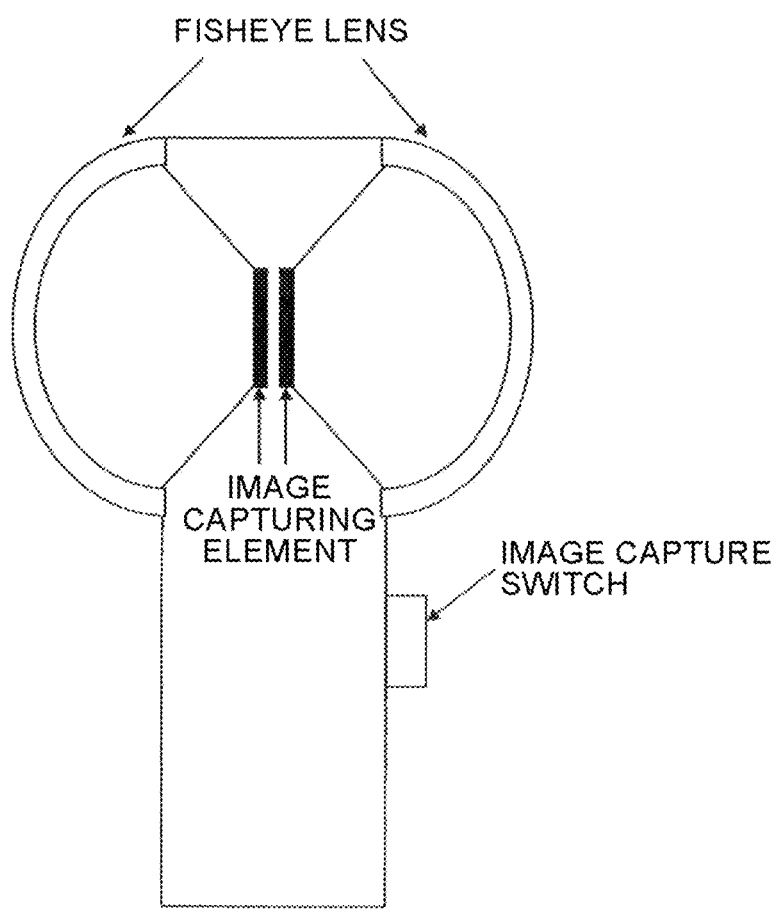
FIG. 2 is an external side view of an omni-directional spherical image capturing apparatus according to the embodiment.

The omni-directional spherical image capturing apparatus will now be described. FIG. 2 is an external side view of the omni-directional spherical image capturing apparatus according to the embodiment.

The present embodiment aims to generate the omni-directional spherical image using the omni-directional spherical image capturing apparatus capable of capturing images in all directions from a capture point. That is to say, the omni-directional spherical image capturing apparatus (digital camera) can capture images in all directions viewed from the capture point.

The digital camera 100 (illustrated in FIG. 1) serving as an omni-directional spherical image capturing apparatus, captures images through the two capturing element 1 (reference numeral: 109) and the image capturing element 2 (reference numeral: 110). The respective capturing elements have a fisheye lens as an example of wide-angle lenses having an angle of view exceeding 180 degrees. The images captured through these two fisheye lenses have a superimposed field with each other. A predetermined image processing such as distortion correction is performed on the images, and the resulting images are converted, and then combined with each other, thereby generating an omni-directional spherical image.

Figure 3:
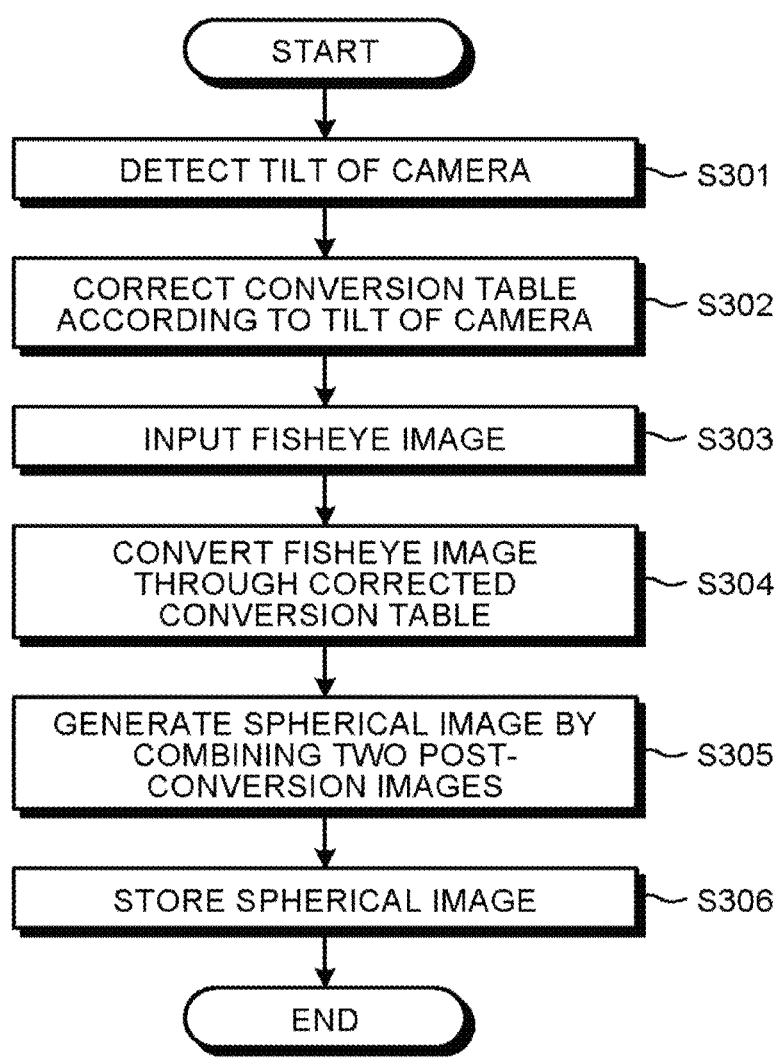
FIG. 3 is a flowchart for explaining operations of the image capturing apparatus according to the embodiment.

Operations of the omni-directional spherical image capturing apparatus according to the embodiment will now be described. FIG. 3 is a flowchart for explaining operations of the image capturing apparatus according to the embodiment. An explanation will be given on the operations of the omni-directional spherical image capturing apparatus from the time when captured images are input to the time when the images are stored in the external storage device 112 (FIG. 1) with reference to FIG. 3.

The acceleration sensor 113 detects a tilt angle of the digital camera 100 at Step (hereinafter, noted as "S") 301. At S302, the controller 10 reads out a conversion table stored in the SDRAM 111, for example, according to a tilt angle of the digital camera 100 detected at S301. The controller 10 then corrects the conversion table in a predetermined correction method. The correction method for the conversion table will be described later.

At S303, two digitized fisheye images captured through the image capturing element 1 (reference numeral: 109) and the image capturing element 2 (reference numeral: 110) are input to the image processing block 104. The image processing block 104 performs typical image processing such as distortion correction. At S304, the controller 10 converts the two captured fisheye images (like the image as illustrated in FIG. 17) using the conversion table corrected at S302. The conversion method will be described later.

At S305, the controller 10 generates a composed omni-directional spherical image utilizing a superimposed field between the two images converted at S304. At S306, the controller 10 stores the omni-directional spherical image generated at S305 in the external storage device 112 through the external storage device I/F 106.

A projection relation of the fisheye lens will now be described as an example of wide-angle lenses employed in the digital camera according to the embodiment. FIG. 4 illustrates a projection relation of a fisheye lens employed in the digital camera according to the embodiment. FIG. 4(a) is an external side view of the fisheye lens; FIG. 4(b) illustrates a projection function f in a plan view of a captured image.

FIG. 17 illustrates an image captured through the fisheye lens with an angle of view over 180 degrees, which is a captured image of an almost hemispherical scene viewed from a capture position. As illustrated in (a) and (b) of FIG. 4, the image is generated with an image height h according to an angle of incidence θ. The relation of the angle of incidence θ and the image height h is defined by a projection function f (h=f(θ)). The projection function varies depending on the characteristic of the fisheye lens.

Examples of a technique (function) of projective transformation include central projection, stereographic projection, equidistant projection, equi-solid-angle projection, and orthographic projection. The central projection is employed when capturing images using a digital camera including a typical angle of view. Other four methods above are employed in a digital camera including a wide-angle lens with an ultra wide angle of view such as a fisheye lens.

A format (form of equation) of the omni-directional spherical image will now be described that is captured by the digital camera according to the embodiment. FIG. 5 illustrates a format of the omni-directional spherical image captured by the digital camera according to the embodiment. FIG. 5(a) illustrates a plane format; FIG. 5(b) illustrates a spherical format.

FIG. 5(a) illustrates a format for developing the omni-directional spherical image into plane coordinates. As illustrated in FIG. 5(a), the plane format is an image including pixel values corresponding to angular coordinates with horizontal angles from 0 to 360 degrees and vertical angles from 0 to 180 degrees. The angular coordinates are related to the points in spherical coordinates as illustrated in FIG. 5(b), which resemble latitude and longitude coordinates on a globe.

Plane coordinates of images captured through the fisheye lens and spherical coordinates of the omni-directional spherical image can be related to each other using the projection function f (h=f(θ)) illustrated in FIG. 4. This enables conversion of two images captured through the fisheye lens and combination (composition) of the resulting images, thereby generating omni-directional spherical images as illustrated in FIGS. 5(a) and (b).

Figure 6:
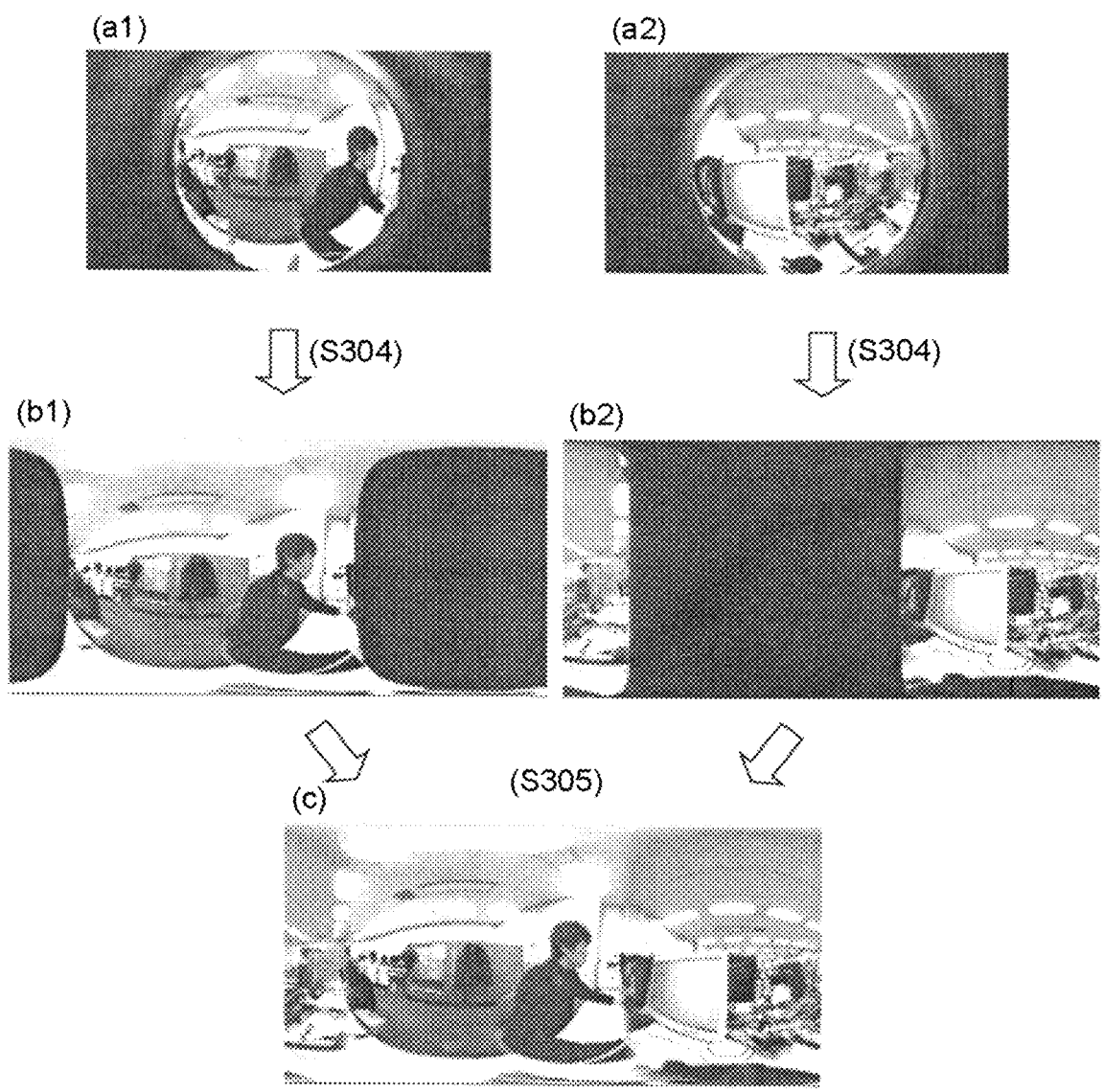
FIG. 6 illustrates the outline of generation processing of the omni-directional spherical image captured by the image capturing apparatus according to the embodiment.

The process of generating the omni-directional spherical image will now be described with reference to an actual image captured through the fisheye lens. FIG. 6 illustrates the outline of generation processing of the omni-directional spherical image captured by the digital camera according to the embodiment. FIGS. 6(a1) and (a2) are images captured with capturing elements through the two fisheye lenses; FIGS. 6(b1) and (b2) are images converted through a conversion table (corresponding to FIG. 5(a)); FIG. 6(c) is an image generated by combining (compositing) the two converted images (corresponding to FIG. 5(b)).

The respective images illustrated in FIGS. 6(a1) and (a2) captured with capturing elements through the two fisheye lenses, which are also schematically illustrated in FIG. 17, are converted into the images illustrated in FIGS. 6(b1) and (b2). This conversion is performed through the processing at S304 illustrated in FIG. 3, i.e., image conversion processing in which the corrected conversion table is used. At this point, the images illustrated in FIGS. 6(b1) and (b2) are presented in a corresponding manner to the omni-directional spherical image format, that is, corresponding to the images illustrated in FIG. 5(a).

Subsequently, the processing at S305 illustrated in FIG. 3 is performed. Specifically, two converted images are combined, thereby generating the omni-directional spherical image. More specifically, the two converted images are superimposed using a superimposed field of the images illustrated in FIGS. 6(b1) and (b2) as a key and composed, whereby an image illustrated in FIG. 6(c), i.e., the omni-directional spherical image is generated.

The correction method for the conversion table at S304 illustrated in FIG. 3 will now be described. FIG. 7 illustrates the conversion table for the omni-directional spherical image captured by the digital camera according to the embodiment.

FIG. 7(a) is a diagram for explaining a conversion table representing a matrix of coordinates of a pre-conversion image and a post-conversion image. FIGS. 7(b) and (c) are diagrams for explaining a correspondence relation of the coordinates of the pre-conversion image (FIG. 7(b)) and the coordinates of post-conversion image (FIG. 7(c)).

FIG. 7(a) illustrates the conversion table used for the image processing at S304 illustrated in FIG. 3. The conversion table includes data sets of coordinates of pixel values of the post-conversion image ($\theta$, $\varphi$) and the corresponding coordinates of pixel values of the pre-conversion image (x, y), for every coordinates of the post-conversion image. The conversion table here represents a tabular data structure, however, another structure may be used as long as it is conversion data.

A post-conversion image is generated from the captured image (pre-conversion image) according to the conversion table illustrated in FIG. 7(a). Specifically, as illustrated in FIGS. 7(b) and (c), pixels in the post-conversion image are generated by referring to the corresponding pixel values in the coordinates in the pre-conversion image, based on the correspondence relation between the pre-conversion image and the post-conversion image in the conversion table (FIG. 7(a)).

Figure 8:
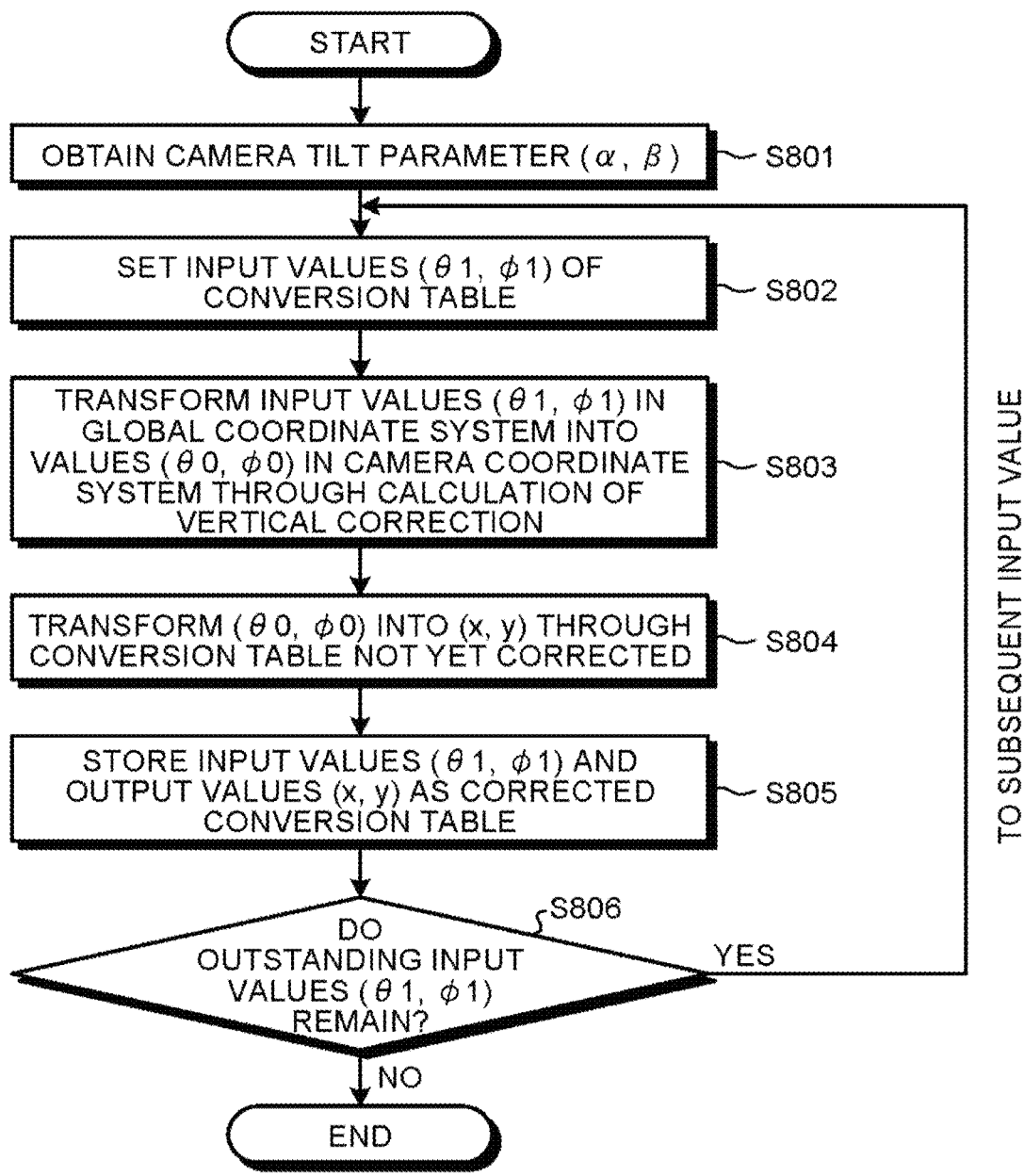
FIG. 8 is a flowchart for explaining operations of correction processing through the conversion table for the omni-directional spherical image captured by the image capturing apparatus according to the embodiment.

An explanation will now be given on processing of correcting the conversion table for the omni-directional spherical image captured by the digital camera according to the embodiment, according to the tilt of the digital camera. FIG. 8 is a flowchart for explaining operations of correction processing on the conversion table for the omni-directional spherical image captured by the image capturing apparatus according to the embodiment.

At S801, the controller 10 obtains a camera tilt parameter ($\alpha$, $\beta$) according to a tilt value of the digital camera 100 detected by the acceleration sensor 113 (FIG. 1). $\alpha$ and $\beta$ in the camera tilt parameter ($\alpha$, $\beta$) represent rotation angles, which will be described later.

At S802, input values ($\theta1$, $\varphi1$) of the conversion table are set. In FIG. 8, values in a camera coordinate system are presented as ($\theta0$, $\varphi0$) and values in a global coordinate system are presented as ($\theta1$, $\varphi1$) so as to be differentiated from ($\theta$, $\varphi$), which are parameter values that depend on a coordinate system. Accordingly, values ($\theta1$, $\varphi1$) in the global coordinate system are set at S802.

At S803, the input values ($\theta1$, $\varphi1$) in the global coordinate system are transformed into the values ($\theta0$, $\varphi0$) in the camera coordinate system through calculation of vertical correction by the controller 10. This calculation of vertical correction will be described later.

At S804, converted values ($\theta0$, $\varphi0$) in the camera coordinate system are transformed into the coordinates (x, y) of the pre-conversion image through the conversion table not yet corrected (FIG. 7(a)). It should be noted that a conversion table for generating a correct omni-directional spherical image needs to be provided in advance. The correct omni-directional spherical image is generated under the condition of the camera without being tilted during capture. The conversion table for generating the correct omni-directional spherical image needs to be stored in a predetermined storage unit such as an SRAM or an SDRAM.

At S805, the controller 10 stores input values ($\theta1$, $\varphi1$) in the global coordinate system and coordinates (x, y) not yet corrected, which are calculated in the end above, as a set of coordinates corresponding to each other in the conversion table already corrected.

At S806, the controller 10 determines whether any outstanding input values ($\theta1$, $\varphi1$) remain. In other words, the controller 10 determines whether any outstanding input values ($\theta1$, $\varphi1$) in the global coordinate system, in which the corresponding coordinates (x, y) not yet corrected is not calculated remain. If the controller 10 determines that outstanding input values ($\theta1$, $\varphi1$) remain (Yes at S806), the processing returns to S802 so that input values ($\theta1$, $\varphi1$) in the global coordinate system are set as a subsequent value.

If the controller 10 determines that no outstanding input values ($\theta1$, $\varphi1$) remain (No at S806), the processing ends. In this case, the controller 10 completes calculation of coordinates (x, y) not yet corrected corresponding to the pixels in the format of the omni-directional spherical image that have input values ($\theta1$, $\varphi1$) in the global coordinate system as coordinates.

The tilt of the digital camera 100 according to the embodiment will now be described. FIG. 9 is a schematic diagram for explaining the tilt of the image capturing apparatus according to the embodiment.

In FIG. 9, the vertical direction corresponds to the z-axis in a three-dimensional (x, y, z) Cartesian coordinates in the global coordinate system. When this direction corresponds to the vertical direction of the digital camera illustrated in FIG. 9, the camera is in a state of not being tilted. When the direction does not correspond to the vertical direction of the digital camera, the digital camera is in a state of being tilted.

A tilt angle $\alpha$ in the gravity vector and a gradient angle $\beta$ in the xy plane are obtained from the equation below using an output of the acceleration sensor. In the equation, Ax refers to a component value in the x0-axis direction in the camera coordinate system of the acceleration sensor, Ay refers to a component value in the y0-axis direction in the camera coordinate system of the acceleration sensor, and Az refers to a component value in the z0-axis direction in the camera coordinate system of the acceleration sensor.

$$\alpha = \text{Arc tan}(Ax/Ay)$$

$$\beta = \text{Arc cos}(Az/\sqrt{Ax^2+Ay^2+Az^2})$$

The calculation of vertical correction will now be described. FIGS. 10(*a*) and 10(*b*) are diagrams for explaining an example of calculation of vertical correction on the omni-directional spherical image captured by the digital camera according to the embodiment. FIG. 10(*a*) illustrates a camera coordinate system; FIG. 10(*b*) illustrates a global coordinate system.

In FIG. 10, three-dimensional Cartesian coordinates in the global coordinate system are presented as (x1, y1, z1) and spherical coordinates in the global coordinate system are presented as ($\theta$1, $\varphi$1). In addition, three-dimensional Cartesian coordinates in the camera coordinate system are presented as (x0, y0, z0) and spherical coordinates in the camera coordinate system are presented as ($\theta$0, $\varphi$0).

Spherical coordinates ($\theta$1, $\varphi$1) are transformed into spherical coordinates ($\theta$0, $\varphi$0) through the equations illustrated in FIG. 10. To correct a tilt, three-dimensional Cartesian coordinates are used to perform rotational transformation at first, thus spherical coordinates ($\theta$1, $\varphi$1) are transformed into three-dimensional Cartesian coordinates (x1, y1, z1) through Equations (1) to (3) illustrated in FIG. 10.

Subsequently, a camera tilt parameter ($\alpha$, $\beta$) is used to transform coordinates (x1, y1, z1) in the global coordinate system into coordinates (x0, y0, z0) in the camera coordinate system through the rotational coordinate transformation illustrated in FIG. 10 (Equation (4)). In other words, this equation (Equation (4) illustrated in FIG. 10) is the definition of the camera tilt parameter ($\alpha$, $\beta$).

This means that the camera coordinate system is obtained by rotating the global coordinate system by $\alpha$ around the z-axis, and then rotating the global coordinate system by $\beta$ around the x-axis. Finally, the three-dimensional Cartesian coordinates (x0, y0, z0) in the camera coordinate system are transformed back to spherical coordinates ($\theta$0, $\varphi$0) in the camera coordinate system through Equations (5) and (6) illustrated in FIG. 10.

Another example of calculation of vertical correction will now be described. FIG. 11 illustrates another example of calculation of vertical correction on the omni-directional spherical image captured by the digital camera according to the embodiment. FIG. 11(*a*) illustrates a camera coordinate system; FIG. 11(*b*) illustrates a global coordinate system.

In the present embodiment, the calculation of vertical correction is accelerated. Equations (1) to (6) described above and illustrated in FIG. 10 according to the embodiment may be presented as Equations (7) to (14) illustrated in FIG. 11.

Specifically, the rotation $\alpha$ and rotation y around the z-axis is the rotation $\theta$ itself in spherical coordinates ($\theta$, $\varphi$). Calculation for rotational transformation can be performed with simple addition or subtraction operations, without transforming into Cartesian coordinate system, thereby accelerating the calculation. Accordingly, transformation with Cartesian coordinate system is required only for the rotational transformation of the rotation $\beta$ around the x-axis. This speeds up the calculation.

Figure 12:
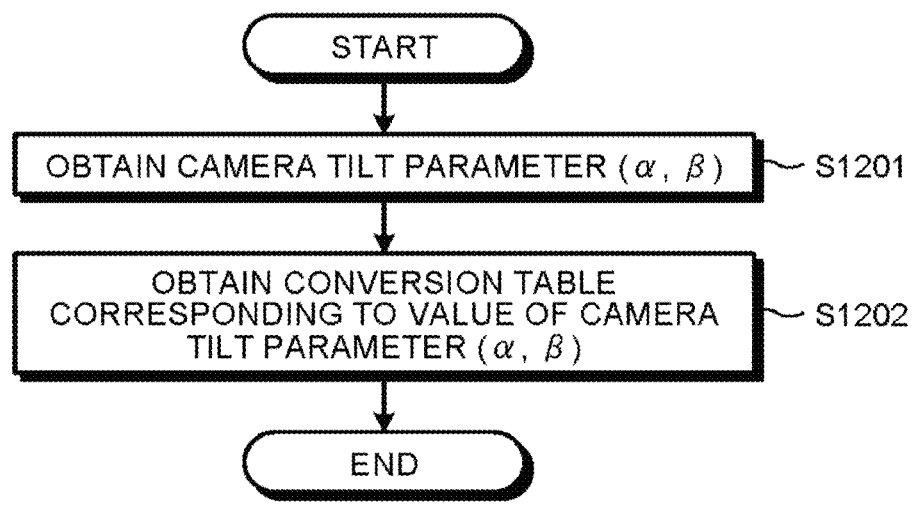
FIG. 12 is another flowchart for explaining operations of correction processing through the conversion table for the omni-directional spherical image captured by the image capturing apparatus according to the embodiment.

An explanation will now be given on another processing of correcting the conversion table for the omni-directional spherical image captured by the digital camera according to the embodiment, according to the tilt of the digital camera. FIG. 12 is another flowchart for explaining operations of correction processing through the conversion table for the omni-directional spherical image captured by the image capturing apparatus according to the embodiment.

In the present embodiment, the correction processing on the conversion table can be accelerated. In the embodiment illustrated in FIG. 11, the correction processing on the conversion table is performed while accelerating the calculation of vertical correction. By contrast, the calculation of vertical correction is omitted to accelerate the calculation in the present embodiment.

With reference to FIG. 12, the correction processing on the conversion table will be described. At S1201, a camera tilt parameter ($\alpha$, $\beta$) is obtained. This processing is the same as the processing at S801 illustrated in FIG. 8.

At S1202, the conversion table corresponding to the value of the camera tilt parameter ($\alpha$, $\beta$) is obtained, then the processing ends. Specifically, the calculation of vertical correction is omitted by storing a plurality of conversion tables so that the conversion tables provide different values depending on the camera tilt parameter ($\alpha$, $\beta$).

The camera tilt parameter ($\alpha$, $\beta$) is a three-dimensional real vector, in principle. If conversion tables are provided only for specific camera tilt parameters ($\alpha$, $\beta$), and the conversion table closest to the detected camera tilt parameter ($\alpha$, $\beta$) is used, all parameters are covered with the provided tables. Alternatively, it is also effective that a plurality of tables close to the detected camera tilt parameter ($\alpha$, $\beta$) are extracted and an interpolation operation such as weighting or obtaining difference. This enables correction of the conversion table only with an interpolation operation, which is relatively simple, thereby suppressing the processing on the operation.

The overall structure of the image capture system according to another embodiment will now be described. FIG. 13 is a schematic block diagram for explaining the overall structure of the image capture system according to the embodiment of the present invention. In the embodiment described above, the tilt correction is performed in a spherical image capturing apparatus (digital camera), however, the tilt correction is not limited to be performed in a spherical image capturing apparatus.

As illustrated in FIG. 13, a wired or wireless communication function is added on the spherical image capturing apparatus to obtain an information processing apparatus capable of performing image processing, such as a computer or a portable information terminal (e.g., smartphone tablet personal computer). The images before correction are transmitted to the information processing apparatus and processing for correcting the tilt can be performed in the destination information processing apparatus (destination device).

The tilt correction processing, however, requires tilt information on the spherical image capturing apparatus. The tilt information on the spherical image capturing apparatus can be detected only in the image capturing apparatus itself, thus the tilt information needs to be transmitted along with the images before correction. The conversion table may be stored in the spherical image capturing apparatus and transmitted along with the images. Alternatively, the conversion table may be transmitted to the destination device in advance as preparation for capturing (e.g., when the destination device recognizes the image capturing apparatus, or when the image capturing apparatus recognizes the destination device).

The conversion table does not need to be transmitted along with the images every time. The conversion table may be transmitted when the destination device requests the conversion table or checks whether the conversion table is the latest one. In addition, the conversion table may not be transmitted necessarily from the image capturing apparatus. For example, the conversion table may be uploaded to a website of the manufacturer that sells the image capturing apparatus so as to be downloaded and stored in the destination device. The conversion table transmitted from the image capturing apparatus may be customized so as to suit the image capturing apparatus.

Figure 14:
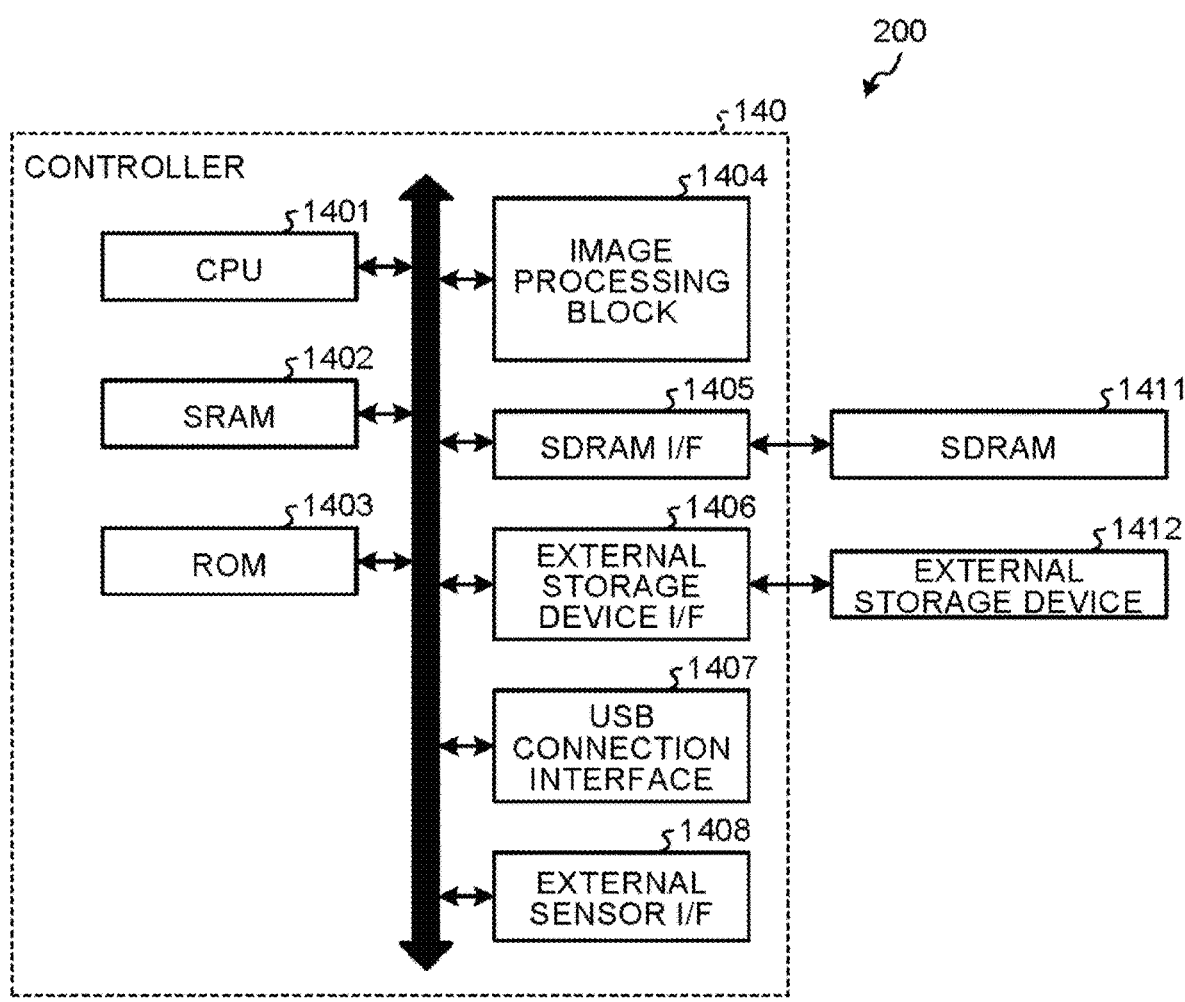
FIG. 14 is a schematic block diagram for explaining the overall structure of an electronic circuit serving as a destination device of the image capture system according to another embodiment.

An explanation will now be given on the destination device 200 in an image capture system according to another embodiment. FIG. 14 is a schematic block diagram for explaining the overall structure of an electronic circuit of the destination device 200 of the image capture system according to another embodiment. In FIG. 14, an SDRAM 1411 and an external storage device 1412 are coupled to a controller 140.

The controller 140 includes a CPU 1401, an SRAM 1402, a ROM 1403, an image processing block 1404, an SDRAM I/F 1405, and an external storage device I/F 1406. The controller 140 also includes a USB connection interface 1407 for connecting to an external device and a wired or wireless network I/F 1408 for connecting to a network.

In the description of the embodiment above, the image processing block 1404 performs typical image processing such as distortion correction and pixel defect correction, and the CPU 1401 reads a predetermined table or a computer program, thereby performing correction processing in the vertical direction according to the tilt of the digital camera 100. It is to be understood, however, that the image processing block 1404 may perform correction processing in the vertical direction.

Figure 15:
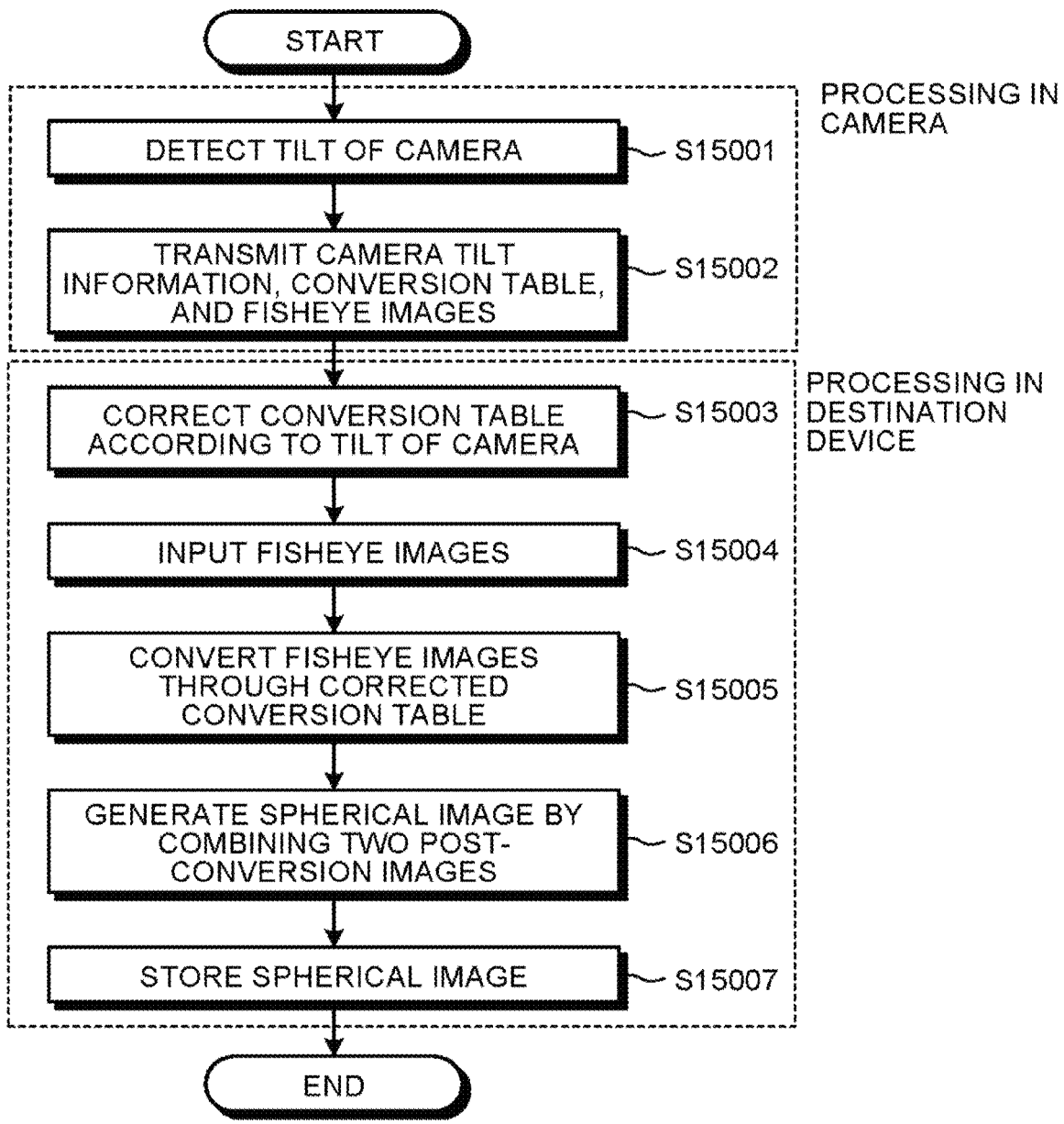
FIG. 15 is a flowchart for explaining operations of the image capture system according to another embodiment.

Operations of the image capture system according to another embodiment will now be described. FIG. 15 is a flowchart for explaining operations of the image capture system according to another embodiment. FIG. 15 illustrates that after a captured image is input, the image is stored in a storage unit of the destination device.

Processing is performed in the digital camera 100 firstly. At S1501, a tilt angle of the digital camera 100 is detected by the acceleration sensor 113 (FIG. 1). At S1502, two fisheye images (as illustrated in FIG. 17) are transmitted to the destination device 200 such as a portable information terminal or a computer by the controller 10. The fisheye images have been captured with the image capturing element 1 (reference numeral: 109) and the image capturing element 2 (reference numeral: 110) and digitized. The transmission above is performed through the USB connection interface 1407 or the network I/F 1408 as illustrated in FIG. 13. Additionally, tilt information on the digital camera and the conversion table are transmitted to the destination device 200 through the USB connection interface 1407 or the network I/F 1408.

As described above, the conversion table may be transmitted in advance when the digital camera 100 and the destination device 200 recognize each other. The conversion table may be transmitted to the destination device 200 only once, that is, the conversion table does not need to be transmitted every time.

The conversion table is stored in the SDRAM 1411 coupled to the digital camera 100, for example, and read out therefrom, then transmitted. This is the end of processing performed in the digital camera 100. The subsequent steps are performed in the destination device 200.

At S1503, the conversion table is corrected in the controller 140 through a predetermined correction method according to the tilt information, which is the transmitted angular information of the digital camera. The correction method for the conversion table is the same in the embodiment described above. At S1504, the transmitted fisheye images captured through the two capturing elements are input to the image processing block 1404 of the destination device 200.

In the image processing block 1404, typical image processing such as distortion correction is performed. At S1505, the two fisheye images are transformed by the controller 140 through the conversion table corrected at S1503. The transformation method is the same as in the embodiment described above.

At S1506, a composed omni-directional spherical image is generated by the controller 140 utilizing the superimposed field of the two images transformed at S1505. At S1507, the omni-directional spherical image generated at S1506 is stored by the controller 140 in the external storage device 1412 through the external storage device I/F 1406.

The operations relating to the flowcharts according to the embodiments illustrated in FIGS. 3, 8, 12, and 15 can be executed by a computer program. Specifically, the CPU (control circuit) 101 (FIG. 1) controlling operations of the image capturing apparatus or the CPU (control circuit) 1401 (FIG. 14) controlling operations of the destination device 200 loads various computer programs stored in a recording medium such as the ROMs 103 and 1403, the SRAMs 102 and 1402, and sequentially executes the programs.

As described above, in the omni-directional spherical image capturing apparatus, or in the image capture system, the vertical direction is detected, and correction is performed on a conversion table used for image processing, and an omni-directional spherical image is generated through the corrected conversion table. This eliminates the necessity of re-making the conversion table from the beginning, thereby reducing the processing time.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An image capturing apparatus, comprising:
a plurality of lenses, each with a different image capturing direction, which are used to capture a plurality of images in response to an image capture instruction;
a sensor to detect a tilt angle of the image capturing apparatus with respect to a direction of gravity; and
circuitry configured to apply a transformation process to each image of the plurality of images captured through the plurality of lenses in response to the image capture instruction, the transformation process including, for each image of the plurality of images:
correcting conversion data according to the detected tilt angle to generate corrected conversion data, the corrected conversion data including a matrix for converting a pre-conversion image to a post-conversion image; and
converting the image, to have a correct vertical direction with respect to the direction of gravity, with the matrix included in the corrected conversion data.

2. The image capturing apparatus according to claim 1, wherein the circuitry is further configured to apply the transformation process, which transforms plane coordinates of the plurality images captured by the image capturing apparatus into spherical coordinates, based on the detected tilt angle.

3. The image capturing apparatus according to claim 1, wherein the at least two lenses face in opposite directions.

4. The image capturing apparatus according to claim 1, further comprising:
two image capturing elements, each corresponding to a different one of the at least two lenses, wherein the two image capturing elements face in opposite directions.

5. The image capturing apparatus according to claim 1, further comprising:
setting circuitry configured to set the conversion data used for transforming plane coordinates into spherical coordinates based on the detected tilt angle, wherein
the circuitry is further configured to transform the plurality of images according to the conversion data.

6. The image capturing apparatus according to claim 1, wherein each of the at least two lenses comprises a wide-angle lens.

7. The image capturing apparatus according to claim 1, wherein each of the at least two lenses comprises a lens with an angle of view equal to or larger than 180 degrees.

8. The image capturing apparatus according to claim 1, further comprising:
setting circuitry configured to set the conversion data used for transforming plane coordinates into spherical coordinates based on the detected tilt angle, wherein
the circuitry is further configured to transform the plurality of images according to the conversion data.

9. The image capturing apparatus of claim 1, wherein
the sensor detects the tilt angle of the image forming apparatus as two angular deviations from the direction of gravity, and
the circuitry is further configured to apply the transformation process to correct each of the plurality of images using the two angular deviations from the direction of gravity.

10. An information processing apparatus, comprising:
circuitry configured to apply a transformation process to each image of a plurality of images captured through a plurality of lenses, each lens of the plurality of lenses having a different image capturing direction of an image capturing apparatus, wherein
the transformation process includes, for each image of the plurality of images:
correcting conversion data according to the a detected tilt angle of the image capturing apparatus with respect to a direction of gravity to generate corrected conversion data, the corrected conversion data including a matrix for converting a pre-conversion image to a post-conversion image; and
converting the image, to have a correct vertical direction with respect to the direction of gravity, with the matrix included in n the corrected conversion data,
the plurality of lenses capture the plurality of images in response to an image capture instruction, and
the circuitry is further configured to apply the transformation process to the plurality of images.

11. The information processing apparatus according to claim 10, wherein each of the at least two lenses comprises a wide-angle lens.

12. The information processing apparatus according to claim 10, wherein each of the at least two lenses comprises a lens with an angle of view equal to or larger than 180 degrees.

13. An image processing method, comprising:
applying a transformation process to each image of a plurality of images captured through a plurality of lenses, each lens of the plurality of lenses having a different image capturing directions direction of an image capturing apparatus, wherein
the transformation process includes, for each image of the plurality of images:
correcting conversion data according to the a detected tilt angle of the image capturing apparatus with respect to a direction of gravity to generate corrected conversion data, the corrected conversion data including a matrix for converting a pre-conversion image to a post-conversion image; and
converting the image, to have a correct vertical direction with respect to the direction of gravity, with the matrix included in the corrected conversion data, and
the plurality of lenses capture the plurality of images in response to an image capture instruction.

14. The image processing method according to claim 13, wherein each of the at least two lenses comprises a wide-angle lens.

15. The image processing method according to claim 13, wherein each of the at least two lenses comprises a lens with an angle of view equal to or larger than 180 degrees.

16. The image processing method according to claim 13, further comprising:
setting the conversion data used for transforming plane coordinates into spherical coordinates, wherein the transforming of the plurality of images is performed according to the conversion data.

17. An image capturing system, comprising:
an image capturing apparatus; and
an information processing apparatus configured to perform image processing, wherein
the image capturing apparatus includes:
a plurality of lenses, each lens of the plurality of lenses having a different image capturing direction;
a sensor to detect a tilt angle of the image capturing apparatus with respect to a direction of gravity; and
a transmitter configured to transmit a plurality of images captured through the plurality of lenses and information of the detected tilt angle,
the information processing apparatus includes a receiver configured to receive the plurality of images captured through the plurality of lenses and the information of the detected tilt angle, and includes circuitry,
the plurality lenses of the image capturing apparatus are used to capture the plurality of images in a response to an image capture instruction,
the transmitter of the image capturing apparatus transmits the plurality of images captured through the plurality of lenses to the information processing apparatus in response to the image capture instruction, and
the circuitry of the information processing apparatus is configured to apply a transformation process to each image of the plurality of images captured through the plurality of lenses, the transformation process including, for each image of the plurality of images:
correcting conversion data according to the information of the detected tilt angle to generate corrected conversion data, the corrected conversion data including a matrix for converting a pre-conversion image to a post-conversion image; and
converting the image, to have a correct vertical direction with respect to the direction of gravity, with the matrix included in the corrected conversion data.

* * * * *